United States Patent
Shibata et al.

(10) Patent No.: US 8,512,903 B2
(45) Date of Patent: Aug. 20, 2013

(54) POLYMER ELECTROLYTE FUEL CELL AND METHOD FOR MEASURING VOLTAGES OF CELLS IN POLYMER ELECTROLYTE FUEL CELL

(75) Inventors: Soichi Shibata, Osaka (JP); Hiroki Kusakabe, Osaka (JP)

(73) Assignee: Panasonic Corporation, Osaka (JP)

( * ) Notice: Subject to any disclaimer, the term of this patent is extended or adjusted under 35 U.S.C. 154(b) by 987 days.

(21) Appl. No.: 12/595,005

(22) PCT Filed: Apr. 14, 2008

(86) PCT No.: PCT/JP2008/000980
§ 371 (c)(1),
(2), (4) Date: Oct. 7, 2009

(87) PCT Pub. No.: WO2008/139683
PCT Pub. Date: Nov. 20, 2008

(65) Prior Publication Data
US 2010/0119907 A1    May 13, 2010

(30) Foreign Application Priority Data
May 8, 2007    (JP) .................................. 2007-123661

(51) Int. Cl.
*H01M 8/04* (2006.01)
(52) U.S. Cl.
USPC ........................... 429/432; 429/452; 429/470
(58) Field of Classification Search
USPC .......................................... 429/432, 452, 470
See application file for complete search history.

(56) References Cited

U.S. PATENT DOCUMENTS

| | | | |
|---|---|---|---|
| 2003/0064261 A1* | 4/2003 | Kikuchi et al. | 429/23 |
| 2005/0186456 A1 | 8/2005 | Andreas-Schott et al. | |
| 2006/0035132 A1* | 2/2006 | Ariyoshi et al. | 429/34 |
| 2007/0108960 A1 | 5/2007 | Chang et al. | |

FOREIGN PATENT DOCUMENTS

| | | |
|---|---|---|
| EP | 1 411 569 A2 | 4/2004 |
| EP | 1 580 829 A1 | 9/2005 |
| JP | 09-283166 | 10/1997 |
| JP | 2002-124285 | 4/2002 |
| JP | 2003-109649 | 4/2003 |
| JP | 2004-362860 A | 12/2004 |
| JP | 2005-216700 A | 8/2005 |
| JP | 2005-293924 | 10/2005 |
| JP | 2005-327558 A | 11/2005 |
| JP | 2006-100106 | 4/2006 |
| JP | 2007-027022 | 2/2007 |

OTHER PUBLICATIONS

Extended European Search Report dated Feb. 26, 2013 issued in corresponding EP Patent Application No. 08738586.0.

* cited by examiner

*Primary Examiner* — Nicholas P D'Aniello
(74) *Attorney, Agent, or Firm* — McDermott Will & Emery LLP

(57) ABSTRACT

A polymer electrolyte fuel cell of the present invention includes: plate-shaped cells (10) each having a pair of plate-shaped separators (6a) and (6b) and a membrane-electrode assembly (5) disposed between the separators (6a) and (6b); a cell stack (50) configured by stacking and fastening the cells (10); and a covering member (60) covering a peripheral surface of the cell stack (50), and voltage measuring terminal insertion holes (61) used to measure the voltages of the cells (10) are formed on the covering member (60) so as to be located at positions corresponding to the separators (6a) and (6b) of the cells (10).

15 Claims, 24 Drawing Sheets

POLYMER ELECTROLYTE FUEL CELL AND METHOD FOR MEASURING VOLTAGES OF CELLS IN POLYMER ELECTROLYTE FUEL CELL

RELATED APPLICATIONS

This application is the U.S. National Phase under 35 U.S.C. §371 of International Application No. PCT/JP2008/000980, filed on Apr. 14, 2008, which in turn claims the benefit of Japanese Application No. 2007-123661, filed on May 8, 2007, the disclosures of which applications are incorporated by reference herein.

TECHNICAL FIELD

The present invention relates to a polymer electrolyte fuel cell and a method for measuring voltages of cells in the polymer electrolyte fuel cell, and particularly to a configuration for maintenance of the polymer electrolyte fuel cell.

BACKGROUND ART

A polymer electrolyte fuel cell (hereinafter referred to as "PEFC") causes a hydrogen-containing fuel gas and an oxygen-containing oxidizing gas, such as air, to electrochemically react with each other to generate electric power and heat at the same time. A unit cell (cell) of the PEFC includes: an MEA (Membrane-Electrode-Assembly; a polymer electrolyte layer-electrode stack body) constituted by a polymer electrolyte layer and a pair of gas diffusion electrodes; gaskets; and electrically-conductive separators. A groove-like gas channel through which the fuel gas or the oxidizing gas (each of which is hereinafter referred to as "reactant gas") is formed on a main surface of each separator which surface contacts the gas diffusion electrode. The gaskets are disposed around a peripheral portion of the MEA, and the pair of separators sandwich the MEA. Thus, the cell is formed. A common cell stack is so-called a stack-type cell stack in which the cells are stacked on one another and fastened, and adjacent MEAs are electrically connected to each other in series.

The cell stack configured as above utilizes the heat generated by electric power generation to maintain the cell stack itself at high temperature, thereby improving an electric power generation efficiency. Further, for example, a domestic fuel cell cogeneration system boils water using remaining heat energy, thereby improving an energy utilization rate. Moreover, Patent Document 1 discloses a polymer electrolyte fuel cell in which a heat insulating material covers an outer surface of the cell stack to further effectively utilize the heat energy generated by the electric power generation.

As described above, the cell stack is a stack of cells. Therefore, to detect abnormalities of the cell stack, it is necessary to monitor not only the voltage of the entire cell stack but also the voltage of the electric power generated by each cell.

However, it has conventionally been difficult to simply and surely measure the voltage of each cell. This is because each cell is reduced in thickness to reduce the weight of the cell stack and downsize the cell stack, so that to measure the voltage of each cell without short-circuiting adjacent cells, a voltage measuring terminal of a voltage measuring device needs to be surely pressed against the target cell, and this requires accurate operations and high dimensional accuracy. In addition, measuring the voltage of each cell is difficult because since the cell stack is formed by stacking a large number of cells, the voltage measuring terminals need to be attached to all the cells, and this requires a large number of operation steps.

To solve the above problems, a fuel cell monitor is known, in which a plurality of voltage measuring terminals are integrated with a comb-teeth support plate (see Patent Document 2 for example). In accordance with the fuel cell monitor disclosed in Patent Document 2, since the voltage measuring terminals are supported by the comb teeth of the support plate, the voltage measuring terminals for a plurality of cells can be attached to the cell stack at one time, and this attaching operation is simple. Moreover, known as a fuel cell stack which simplifies an operation of attaching a voltage detecting device is a fuel cell stack in which a cell voltage terminal is integrated with the separator (see Patent Document 3 for example).

Moreover, known as a voltage measuring device which surely causes the voltage measuring terminal to contact the separator is a voltage measuring device in which an electrical insulating elastic plate is provided with a voltage obtaining terminal (see Patent Document 4 for example). In the voltage measuring device disclosed in Patent Document 4, the separator is provided with a concave portion, and the voltage obtaining terminal is pressed against the concave portion by the elastic force of the elastic plate. With this, the voltage obtaining terminal can be surely caused to contact the separator, and the accuracy of the voltage measurement can be improved.

Further, known as a fuel cell stack which effectively maintain the stiffness of a casing itself is a fuel cell stack in which an opening is formed for every unit cell or every plural unit cells on at least one surface of the casing (see Patent Document 5 for example). In the fuel cell stack disclosed in Patent Document 5, a plurality of openings each larger than the voltage terminal are formed at positions corresponding to the voltage terminals each attached for every unit cell or every plural unit cells. This can effectively maintain the stiffness of the casing as compared to a case of forming an elongated opening extending in a stack direction of the unit cells.

Patent Document 1: Japanese Laid-Open Patent Application Publication 2005-327558
Patent Document 2: Japanese Laid-Open Patent Application Publication 2006-140166
Patent Document 3: Japanese Laid-Open Patent Application Publication 2005-216700
Patent Document 4: Japanese Laid-Open Patent Application Publication 2004-362860
Patent Document 5: Japanese Laid-Open Patent Application Publication

DISCLOSURE OF THE INVENTION

Problems to be Solved by the Invention

However, in many cases, the fuel cell including the above conventional voltage measuring device is covered with the above-described heat insulating material to prevent excess heat release of the cell stack. Therefore, as below, there is still room for improvement in view of efficient maintenance.

To be specific, in accordance with a fuel cell system incorporating the above-described conventional fuel cell, in a case where an abnormality of the cell stack is detected by the voltage measuring device, specifying a portion where the abnormality has occurred takes time and labor, i.e., specifying whether the portion where the abnormality has occurred is the cell stack, the voltage measuring device itself, or a component, such as a unit of a gas system, other than the cell stack, takes time and labor.

On this account, even if the abnormality is detected at an installation location of the polymer electrolyte fuel cell system (for example, at a user's house in the case of the domestic fuel cell cogeneration system), efficient maintenance cannot be carried out, i.e., for example, it is impossible that only the cell stack in the polymer electrolyte fuel cell system is selectively detached from the system and replaced with a new one. In this case, all of the suspected units or the entire system need to be taken to a maintenance factory, and inspected and repaired at the maintenance factory.

Further, the abnormality may occur in the voltage measuring device itself by corrosion of the voltage measuring terminal, curing or deformation of resin due to time degradation, or the like. In such case, to find out whether the voltage measuring device is normal or not, first, the heat insulating material covering the cell stack needs to be detached since the voltage measuring device is stored in the heat insulating material. Then, the voltage measurement of each cell needs to be carried out by a different voltage measuring device from the above voltage measuring device, and the result of this measurement and the result of the measurement by the voltage measuring device of the fuel cell needs to be cross-checked. This takes time and labor.

The present invention was made in light of the problems of the above prior arts, and an object of the present invention is to provide a polymer electrolyte fuel cell and a method for measuring voltages of cells in the polymer electrolyte fuel cell, each of which realizes efficient maintenance of the polymer electrolyte fuel cell.

Means for Solving the Problems

In order to solve the above problems, a polymer electrolyte fuel cell of the present invention includes: plate-shaped cells each including a pair of plate-shaped electrically-conductive separators on each of which a reactant gas channel is formed, and a membrane-electrode assembly disposed between the pair of separators; a cell stack configured by stacking and fastening the cells; and a covering member covering at least a peripheral surface of the cell stack, wherein voltage measuring terminal insertion holes used to measure voltages of the cells are formed on the covering member so as to be located at positions corresponding to the separators of the cells.

By forming the voltage terminal insertion holes, the voltages of the cells can be monitored without detaching the covering member. In addition, since the voltage measuring terminals are not inserted into the voltage terminal insertion holes at any time other than a time when the voltage terminal insertion holes are used for maintenance, the heat release via the voltage measuring terminals can also be prevented.

Moreover, in the polymer electrolyte fuel cell of the present invention, the covering member may be formed in a casing shape to entirely cover the cell stack.

Moreover, in the polymer electrolyte fuel cell of the present invention, the voltage measuring terminal insertion holes may be formed in a zigzag manner.

With this, it is possible to prevent the voltage measuring terminal from being mistakenly inserted into the incorrect hole when carrying out the maintenance.

Moreover, in the polymer electrolyte fuel cell of the present invention, a cutout portion may be formed at an end portion of one of the separators constituting the cell, and the cutout portion may be formed so as to be located adjacent to a portion of the other one of the separators constituting the cell which portion corresponds to the voltage measuring terminal insertion hole.

Since a domestic fuel cell cogeneration system used at home is placed at various locations, the voltage measuring terminal may be mistakenly inserted obliquely depending on the installation location. Therefore, by forming the cutout portion, it is possible to prevent one voltage measuring terminal from contacting both separators even if the voltage measuring terminal is obliquely inserted. Therefore, the voltages of the cells can be measured without causing short-circuiting.

Moreover, in the polymer electrolyte fuel cell of the present invention, a convex portion may be formed at a portion of the covering member which portion is opposed to a peripheral surface of the cell, a concave portion may be formed on a peripheral surface of the separator, and the convex portion may fit in the concave portion by covering the cell stack with the covering member.

With this configuration, the position of the covering member with respect to the cell stack can be more accurately fixed. In addition, the voltage measuring terminal insertion hole can be surely caused to face the target cell.

Moreover, in the polymer electrolyte fuel cell of the present invention, a cross-sectional shape of the voltage measuring terminal insertion hole corresponding to one of the separators may be different from a cross-sectional shape of the voltage measuring terminal insertion hole corresponding to the other one of the separators.

With this, it is possible to prevent the voltage measuring terminal from being mistakenly inserted into the incorrect position when carrying out the maintenance.

Moreover, in the polymer electrolyte fuel cell of the present invention, a size of a cross-sectional shape of the voltage measuring terminal insertion hole corresponding to one of the separators may be different from a size of a cross-sectional shape of the voltage measuring terminal insertion hole corresponding to the other one of the separators.

With this, it is possible to prevent the voltage measuring terminal from being mistakenly inserted into the incorrect hole when carrying out the maintenance.

Moreover, it is preferable that in the polymer electrolyte fuel cell of the present invention, a size of the voltage measuring terminal insertion hole be smaller than a thickness of the separator.

With this, it is possible to prevent excess heat release from the polymer electrolyte fuel cell and also possible to prevent the short-circuiting when measuring the voltages of the cells.

Moreover, in the polymer electrolyte fuel cell of the present invention, the voltage measuring terminal insertion hole may be closed by a stopper member at any time other than a time when the voltage measuring terminal insertion hole is used for voltage measurement.

With this, it is possible to surely prevent the heat loss at any time other than a time of the maintenance.

Moreover, it is preferable that in the polymer electrolyte fuel cell of the present invention, heat conductivity of the stopper member may be equal to or lower than heat conductivity of the covering member.

With this, it is possible to more surely prevent the heat loss at any time other than the time of the maintenance of the fuel cell.

Moreover, in the polymer electrolyte fuel cell of the present invention, a fuel cell monitoring device configured to measure the voltages of the cells may be disposed inside the covering member.

With this, the value measured by the fuel cell monitoring device and the value measured by using the voltage terminal insertion holes can be easily compared with each other at the time of the maintenance, so that efficient maintenance can be carried out. Moreover, since cross-check can be easily carried out, whether the fuel cell monitoring device has a malfunction or not can be determined on site. Further, since it is possible to avoid unnecessary replacement of components, cost for transporting the cell stack or the domestic fuel cell cogeneration system to a maintenance factory can be cut.

Moreover, in the polymer electrolyte fuel cell of the present invention, the covering member may be constituted by a heat insulating member.

Moreover, in the polymer electrolyte fuel cell of the present invention, the covering member may be constituted by a storing member.

Moreover, in the polymer electrolyte fuel cell of the present invention, the covering member may be constituted by a heat insulating member and a storing member.

Further, in a method for measuring voltages of cells in a polymer electrolyte fuel cell according to the present invention, the polymer electrolyte fuel cell includes: cells each including a pair of plate-shaped electrically-conductive separators on each of which a reactant gas channel is formed, and a membrane-electrode assembly disposed between the pair of separators; a cell stack configured by stacking and fastening the cells; and a covering member covering at least peripheral surfaces of the stacked cells of the cell stack, wherein: voltage measuring terminal insertion holes used to measure the voltages of the cells are formed on the heat insulating member so as to be located at positions corresponding to the separators of the cells; and voltage measuring terminals are inserted into the voltage measuring terminal insertion holes to measure the voltages of the cells.

With this, the voltages of the cells can be monitored without detaching the covering member. In addition, since the voltage measuring terminals are not inserted into the voltage terminal insertion holes at any time other than the time when the voltage terminal insertion holes are used for maintenance, the heat release via the voltage measuring terminals can also be prevented.

The above object, other objects, features and advantages of the present invention will be made clear by the following detailed explanation of preferred embodiments with reference to the attached drawings.

Effects of the Invention

In accordance with the polymer electrolyte fuel cell and the method for measuring the voltages of the cells in the polymer electrolyte fuel cell according to the present invention, the voltages of the cells can be monitored without detaching the covering member covering the cell stack, and the malfunction of the fuel cell system can be specified on site for maintenance. In addition, since the voltage measuring terminals are not inserted into the voltage terminal insertion holes at any time other than the time when the voltage terminal insertion holes are used for maintenance, the heat release via the voltage measuring terminals can be prevented.

Further, in accordance with a fuel cell system including the polymer electrolyte fuel cell of the present invention, the maintenance can be efficiently and surely carried out.

BRIEF DESCRIPTION OF THE DRAWINGS

FIG. 5($b$) is a front view schematically showing a schematic configuration of an anode separator of the polymer electrolyte fuel cell shown in FIG. 5($a$).

FIG. 5($c$) is a front view schematically showing a schematic configuration of a cathode separator of the polymer electrolyte fuel cell shown in FIG. 5($a$).

FIG. 6($b$) is a cross-sectional view taken along a plane VIB shown in FIG. 6($a$).

Figure 1:
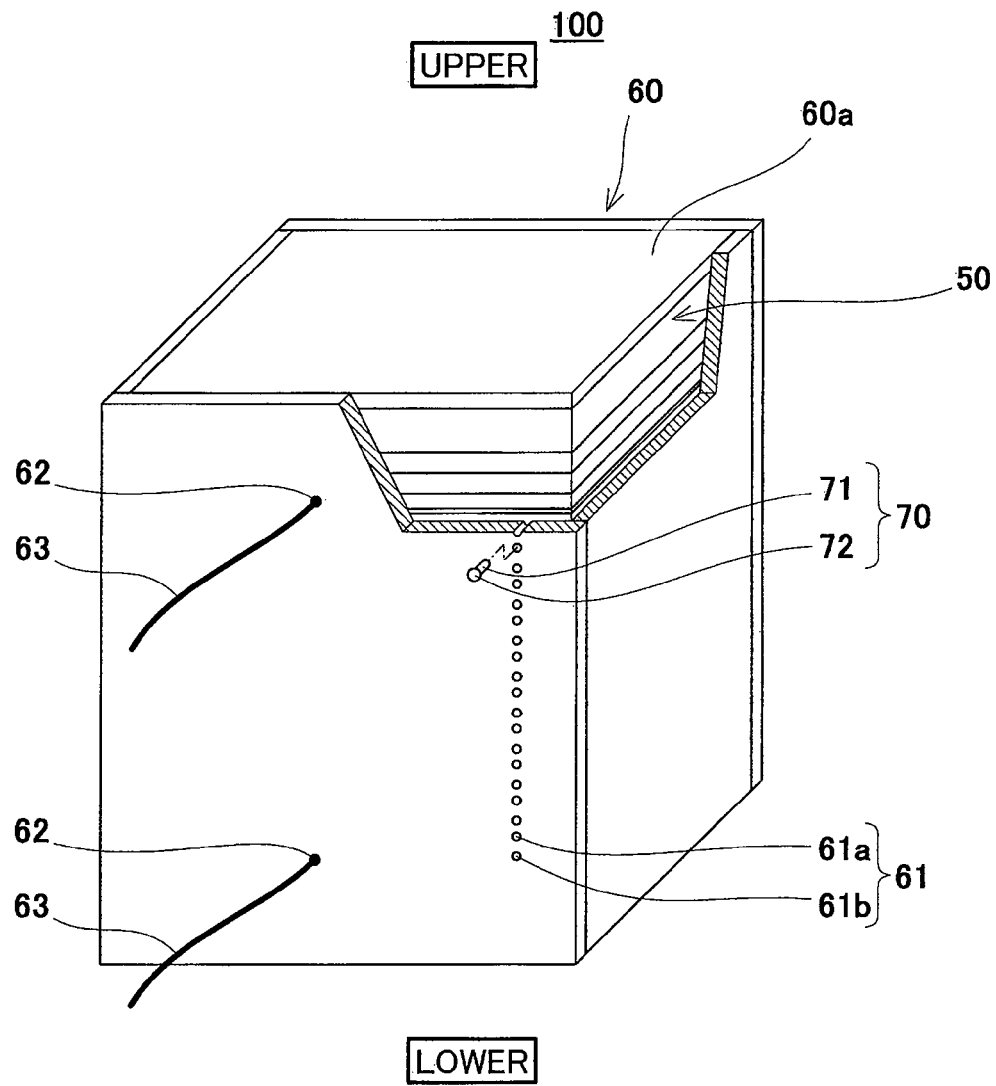
FIG. 1 is a perspective view schematically showing a schematic configuration of a polymer electrolyte fuel cell according to Embodiment 1 of the present invention.

EXPLANATION OF REFERENCE NUMBERS 1 polymer electrolyte membrane
2a anode catalyst layer
2b cathode catalyst layer
3a anode gas diffusion layer
3b cathode gas diffusion layer
4a anode
4b cathode
5 MEA (membrane-electrode assembly)
6a anode separator
6b cathode separator
7 gasket
8 heat medium channel
9 cathode gas channel
10 cell
21 fuel gas supplying manifold hole
22 fuel gas discharging manifold hole
23 oxidizing gas supplying manifold hole
24 oxidizing gas discharging manifold hole
25 heat medium supplying manifold hole
26 heat medium discharging manifold hole
30a cutout portion
30b cutout portion
40 fuel cell monitoring device
50 cell stack
51 cell stack body
52a first end plate
52b second end plate
53a first current collector
53b second current collector
54a first insulating plate
54b second insulating plate
60 heat insulating casing
60a heat insulating plate
61 voltage measuring terminal insertion hole
61a voltage measuring terminal insertion hole
61b voltage measuring terminal insertion hole
61c voltage measuring terminal insertion hole
61d voltage measuring terminal insertion hole
61e voltage measuring terminal insertion hole
61f voltage measuring terminal insertion hole
62 through hole
63 electric wire
65 through hole
66 wire
70 stopper member
70a stopper member
71 main body portion
71a main body portion
72 head portion
80 convex portion
81 storing casing
81a storing plate
90 storing concave portion
100 polymer electrolyte fuel cell (PEFC)

BEST MODE FOR CARRYING OUT THE INVENTION

Hereinafter, preferred embodiments of the present invention will be explained in reference to the drawings. In the drawings, the same reference numbers are used for the same or corresponding portions, and a repetition of the same explanation is avoided.

Embodiment 1

FIG. 1 is a perspective view schematically showing a schematic configuration of a polymer electrolyte fuel cell according to Embodiment 1 of the present invention. In FIG. 1, a part of the polymer electrolyte fuel cell is cut away to show an internal structure thereof, and a vertical direction of the polymer electrolyte fuel cell is shown as a vertical direction of the drawing.

As shown in FIG. 1, a polymer electrolyte fuel cell (hereinafter referred to as "PEFC") 100 according to Embodiment 1 includes a cell stack 50, a heat insulating casing 60, and stopper members 70.

First, the cell stack 50 will be explained in reference to FIG. 2.

Figure 2:
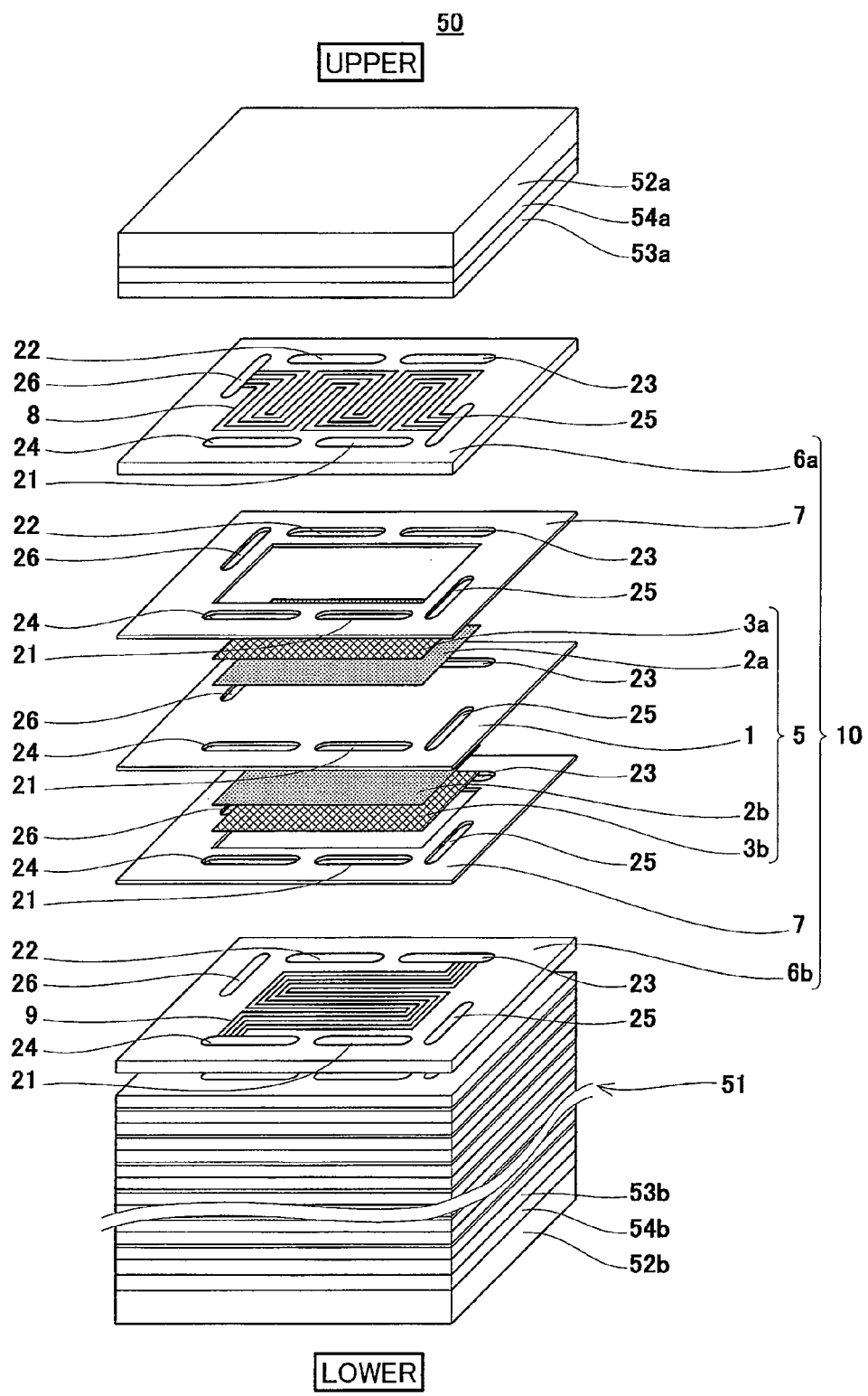
FIG. 2 is a developed view schematically showing a cell stack and cells constituting the cell stack in the polymer electrolyte fuel cell shown in FIG. 1.

FIG. 2 is a developed view schematically showing the cell stack 50 and cells constituting the cell stack 50 in the PEFC 100 shown in FIG. 1. In FIG. 2, a part of the cell stack 50 is omitted, and a vertical direction of the cell stack 50 is shown as a vertical direction of the drawing.

As shown in FIG. 2, the cell stack 50 includes: a cell stack body 51 formed by stacking cells 10 in a thickness direction of the cell 10, each cell 10 having a plate shape; first and second end plates 52a and 52b respectively disposed on both ends of the cell stack body 51; and fastening members (not shown) fastening the cell stack body 51 and the first and second end plates 52a and 52b in a stack direction of the cells. Moreover, a first current collector 53a and a first insulating plate 54a are disposed between the first end plate 52a and the cell stack body 52. Similarly, a second current collector 53b and a second insulating plate 54b are disposed between the second end plate 52b and the cell stack body 51.

Moreover, the first end plate 52a and the like disposed on both ends of the cell stack body 51 are provided with through holes extending in the thickness direction, and the through holes are formed to be communicated with below-described respective manifolds. Pipes through which a fuel gas and the like are, for example, supplied to the PEFC 100 are suitably connected to the through holes (not shown). With this, a hydrogen-containing fuel gas and an oxygen-containing oxidizing gas supplied to the PEFC 100 react with each other to generate electric power and heat.

The cell 10 includes an MEA 5 (membrane-electrode assembly), a pair of gaskets 7, an anode separator 6a, and a cathode separator 6b.

The MEA 5 includes a polymer electrolyte membrane 1 which selectively transports hydrogen ions, an anode 4a, and a cathode 4b. The anode 4a and the cathode 4b (each of which is referred to as "gas diffusion electrode") are disposed to be respectively located at inner regions of both surfaces of the polymer electrolyte membrane 1 which regions are located on an inner side of a peripheral portion of the polymer electrolyte membrane 1.

The anode 4a includes an anode catalyst layer 2a and an anode gas diffusion layer 3a. The anode catalyst layer 2a is disposed on one main surface of the polymer electrolyte membrane 1 and contains, as a major component, carbon powder supporting platinum-based metal catalyst. The anode gas diffusion layer 3a is disposed on the anode catalyst layer 2a and has both gas permeability and electrical conductivity. Similarly, the cathode 4b includes a cathode catalyst layer 2b and a cathode gas diffusion layer 3b. The cathode catalyst layer 2b is disposed on the other main surface of the polymer electrolyte membrane 1 and contains, as a major component, carbon powder supporting platinum-based metal catalyst. The cathode gas diffusion layer 3b is disposed on the cathode catalyst layer 2b and has both gas permeability and electrical conductivity.

The pair of gaskets 7 are respectively disposed around the anode 4a and the cathode 4b so as to sandwich the polymer electrolyte membrane 1. With this, the fuel gas and the oxidizing gas can be prevented from leaking to the outside of the cell and prevented from being mixed with each other in the cell 10.

The anode separator 6a and the cathode separator 6b each having a plate shape and electrical conductivity are disposed to sandwich the MEA 5 and the pair of gaskets 7. Used as each of the separators 6a and 6b is a resin-impregnated graphite plate formed by impregnating a graphite plate with phenol resin and hardening the graphite plate. Moreover, the separators 6a and 6b may be made of a metallic material, such as SUS. The MEA 5 is mechanically fixed by the anode separator 6a and the cathode separator 6b, and adjacent MEAs 5 are electrically connected to each other in series via the separators 6a and 6b.

Formed on a peripheral portion of each of the polymer electrolyte membrane 1, the gaskets 7, the anode separator 6a, and the cathode separator 6b are a fuel gas supplying manifold hole 21, an oxidizing gas supplying manifold hole 23, a heat medium supplying manifold hole 25, a fuel gas discharging manifold hole 22, an oxidizing gas discharging manifold hole 24, and a heat medium discharging manifold hole 26, which are through holes extending in a thickness direction of each of the polymer electrolyte membrane 1, the gaskets 7, the anode separator 6a, and the cathode separator 6b.

A groove-like anode gas channel through which the fuel gas flows is formed in a serpentine shape on an inner surface (surface contacting the MEA 5) of the anode separator 6a so as to connect the fuel gas supplying manifold hole 21 and the fuel gas discharging manifold hole 22 (not shown). In addition, a groove-like heat medium channel 8 through which the heat medium flows is formed in a serpentine shape on an outer surface of the anode separator 6a.

A groove-like cathode gas channel 9 through which the oxidizing gas flows is formed in a serpentine shape on an inner surface of the cathode separator 6b. In addition, a groove-like heat medium channel through which the heat medium flows is formed in a serpentine shape on an outer surface of the cathode separator 6b so as to connect the heat medium supplying manifold hole 25 and the heat medium discharging manifold hole 26 (not shown).

Herein, each of the fuel gas channel, the oxidizing gas channel 9, and the heat medium channel 8 is formed in a serpentine shape. However, the present embodiment is not limited to this, and each of these channels may have any shape as long as each of the reactant gases and the heat medium flows through substantially the entire region of the main surface of each of the separators 6a and 6b.

The cells 10 formed as above are stacked in the thickness direction of the cell 10 to form the cell stack body 50. Moreover, the manifold holes, such as the fuel gas supplying manifold hole 21, formed on the anode separator 6a, the gaskets 7, the polymer electrolyte membrane 1, and the cathode separator 6b are connected to one another in the thickness direction by stacking the cells 10. Thus, manifolds, such as a fuel gas supplying manifold, are formed.

As shown in FIG. 1, the heat insulating casing 60 is formed to cover the entire cell stack 50. Herein, the heat insulating casing 60 is constituted by six heat insulating plates (covering members) 60a which respectively cover six surfaces of the cell stack 50. In a case where each of the first and second end plates 52a and 52b is constituted by a member having an heat insulating property, the heat insulating plates 60a covering the first and second end plates 52a and 52b of the cell stack 50 may be omitted, and the heat insulating plates 60a may form a tubular shape. Moreover, the PEFC 100 may be formed such that: the heat insulating casing 60 is formed in a tubular shape using the heat insulating plates 60a; peripheral surfaces (hereinafter referred to as a peripheral surface of the cell stack body 51) of the cells 10 stacked to constitute the cell stack 50 are covered with the tubular heat insulating casing 60; and different heat insulating plates 60a respectively cover the first and second end plates 52a and 52b. Urethane foam or the like can be used as the heat insulating casing 60 and the heat insulating plate 60a. For ease of manufacturing and processing, it is preferable that the heat insulating casing 60 and the heat insulating plate 60a be made of a stretchable material.

Voltage measuring terminal insertion holes 61 are formed on the heat insulating casing 60 (to be precise, the heat insulating plate 60a) covering the peripheral surface of the cell stack 50 so as to be located at positions corresponding to the anode separators 6a and the cathode separators 6b constituting the cells 10. Specifically, a voltage measuring terminal insertion hole 61a corresponding to the anode separator 6a and a voltage measuring terminal insertion hole 61b corresponding to the cathode separator 6b (these holes are referred to as "voltage measuring terminal insertion hole 61") are formed to penetrate the heat insulating plate 60a in a thickness direction of the heat insulating plate 60a. The voltage measuring terminal insertion holes 61a and the voltage measuring terminal insertion holes 61b are arranged in the stack direction of the cells 10 (the holes 61a and 61b overlap one another when viewed from the stack direction of the cells 10) and are provided at predetermined intervals. The voltage measuring terminal insertion holes 61 are formed on the heat insulating plate 60a such that the number of voltage measuring terminal insertion holes 61 corresponds to the number of stacked cells 10 (for example, 10 to 200). The voltage measuring terminal insertion holes 61 are arranged at predetermined intervals such that when the heat insulating plate 60a covers the peripheral surface of the cell stack 50, end surfaces of the anode separators 6a and the cathode separators 6b of the cells 10 and openings of the voltage measuring terminal insertion holes 61 are respectively opposed to one another. With this, voltage measuring terminals of the voltage measuring device can be inserted into the voltage measuring terminal insertion holes 61 to measure the voltages of the cells 10 without detaching the heat insulating casing 60 covering the cell stack 50.

Herein, the voltage measuring terminal insertion holes 61 are formed on the heat insulating plate 60a covering one surface of the peripheral surface of the cell stack body 51. However, the present embodiment is not limited to this. The voltage measuring terminal insertion holes 61 may be formed on not only the heat insulating plate 60a covering one surface of the peripheral surface of the cell stack body 51 but also the heat insulating plate 60a covering the other surface of the peripheral surface of the cell stack body 51. Moreover, the voltage measuring terminal insertion holes 61 may be formed at plural portions of the heat insulating plate 60a covering one surface of the peripheral surface of the cell stack body 51. The voltage measuring terminal insertion holes 61 may be formed at any portion of the heat insulating plates 60a covering the peripheral surface of the cell stack body 51 as long as the voltage measuring terminal insertion holes 61 are formed at positions respectively corresponding to the peripheral surfaces of the anode separators 6a and the cathode separators 6b of the cells 10. Moreover, to prevent excess heat release during the operation of the PEFC 100, it is preferable that the size of the cross-sectional shape of the voltage measuring terminal insertion hole 61 be smaller than the thickness of each of the anode separator 6a and the cathode separator 6b. The thickness of each of the anode separator 6a and the cathode separator 6b is very small, i.e., several millimeters. Therefore, when the voltage measuring terminals are caused to respectively contact side surfaces of the anode separator 6a and the cathode separator 6b to measure the voltage of the cell 10, the voltage measuring terminal tends to mistakenly contact the separators of the same cell to cause short-circuiting. However, in the present embodiment, since the size of the cross-sectional shape of the voltage measuring terminal insertion hole 61 is smaller than the thickness of each of the anode separator 6a and the cathode separator 6b, it is possible to prevent the voltage measuring terminal from mistakenly contacting the separators of the same cell to cause the short-circuiting.

Moreover, when not measuring the voltages of the cells 10, the voltage measuring terminal insertion holes 61 are closed by the stopper members 70. Herein, the stopper member 70 is constituted by a main body portion 71 and a head portion 72 which is formed at a base end of the main body portion 71 and whose cross-sectional area is larger than that of the main body portion 71. The main body portion 71 of the stopper member 70 is fittingly inserted in the voltage measuring terminal insertion hole 61. With this, the heat release from the voltage measuring terminal insertion hole 61 can be surely prevented.

The stopper member 70 may have any shape as long as it can prevent the heat release from the voltage measuring terminal insertion hole 61. For example, a plate-shaped member may cover the voltage measuring terminal insertion hole 61. Moreover, to more surely prevent the heat release from the PEFC 100 via the stopper member 70, it is preferable that the heat conductivity of the stopper member 70 be equal to or lower than that of the heat insulating member 60.

Moreover, the heat insulating casing 60 is provided with a pair of through holes 62 penetrating the heat insulating plate 60a in a thickness direction of the heat insulating plate 60a. An electric wire 63 is inserted into the through hole 62. One end of the electric wire 63 is connected to the first current collector 53a or the second current collector 53b constituting the cell stack 50. With this, the electric power generated by the PEFC 100 can be supplied to the outside via the electric wire 63.

To prevent the heat release from the PEFC 100 via the through hole 62 and the electric wire 63, a portion of the electric wire 63 which portion extends from the through hole 62 is heat-insulated by a suitable means.

Next, a method for measuring the voltage of the cell 10 in the PEFC 100 according to Embodiment 1 will be explained.

First, the stopper members 71 closing a pair of voltage measuring terminal insertion holes 61 formed at positions corresponding to the anode separator 6a and the cathode separator 6b of the cell 10 that is a voltage measurement target are detached. Then, the voltage measuring terminals of the voltage measuring device are respectively inserted into the pair of voltage measuring terminal insertion holes 61 and are caused to respectively contact the end surfaces of the anode separator 6a and the cathode separator 6b. With this, the voltage of the cell 10 can be measured. By measuring the voltage of each cell 10, a malfunction of the PEFC 100 can be specified.

With this configuration, the PEFC 100 according to Embodiment 1 can measure the voltage of each cell 10 without detaching the heat insulating member 60 covering the cell stack 50. Therefore, the maintenance of the PEFC 100 can be efficiently and surely carried out. Moreover, the voltage measuring terminal insertion holes 61 are closed by the stopper members 70 at any time other than the time of the maintenance, and the voltage measuring terminals are not inserted into the voltage terminal insertion holes 61. Therefore, it is possible to prevent the heat release (loss) from the PEFC 100 via the voltage measuring terminal insertion holes 61.

Next, Modification Example of the voltage measuring terminal insertion hole 61 of the PEFC 100 according to Embodiment 1 will be explained.

Modification Example 1

Figure 3:
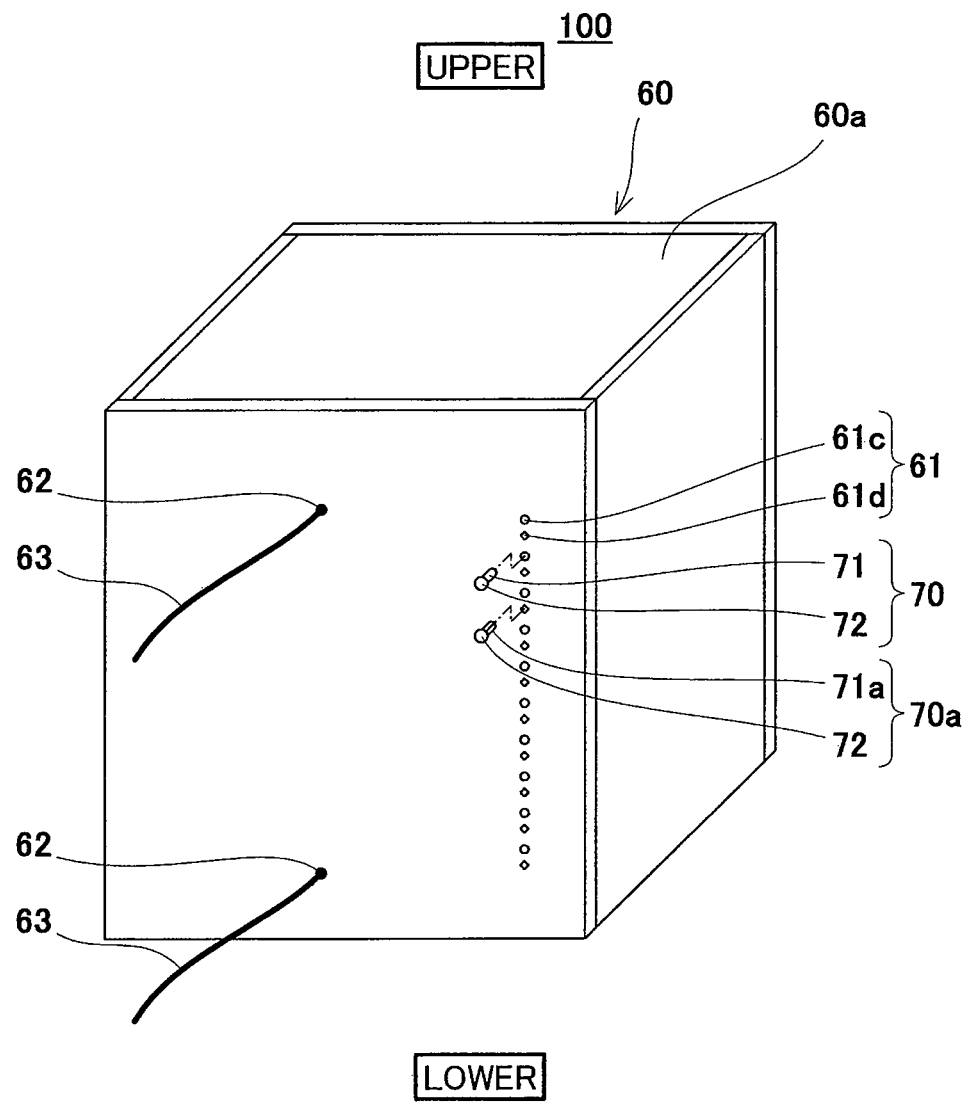
FIG. 3 is a perspective view schematically showing a schematic configuration of Modification Example 1 of the polymer electrolyte fuel cell according to Embodiment 1.

FIG. 3 is a perspective view schematically showing a schematic configuration of Modification Example 1 of the PEFC 100 according to Embodiment 1. In FIG. 3, a vertical direction of the PEFC 100 is shown as a vertical direction of the drawing.

As shown in FIG. 3, the voltage measuring terminal insertion hole 61 of the PEFC 100 of Modification Example 1 is constituted by a voltage measuring terminal insertion hole 61c and a voltage measuring terminal insertion hole 61d. The voltage measuring terminal insertion hole 61c is a through hole formed on the heat insulating plate 60a and has a circular cross-sectional shape. The voltage measuring terminal insertion hole 61d is a through hole formed on the heat insulating plate 60a and has a diamond cross-sectional shape. A pair of the voltage measuring terminal insertion holes 61c and 61d are arranged in the stack direction of the cells 10 in the cell stack body 51, and are formed at positions respectively corresponding to the anode separator 6a and the cathode separator 6b (herein, the voltage measuring terminal insertion hole 61c is formed at a position corresponding to the anode separator 6a, and the voltage measuring terminal insertion hole 61d is formed at a position corresponding to the cathode separator 6b). With this, it is possible to prevent the voltage measuring terminal from being mistakenly inserted into the incorrect hole when carrying out the maintenance (when measuring the voltage of each cell 10).

Moreover, in the PEFC 100 of Modification Example 1, the cross-sectional shape of a main body portion 71a of a stopper member 70a closing the voltage measuring terminal insertion hole 61d is formed in a diamond shape that is the same as the cross-sectional shape of the voltage measuring terminal insertion hole 61d. With this, the voltage measuring terminal insertion holes 61 can be sealed by the stopper members 70, so that the heat release from the voltage measuring terminal insertion holes 61 can be surely prevented.

Herein, the cross-sectional shapes of the voltage measuring terminal insertion holes 61c and 61d are the circular shape and the diamond shape. However, the present modification example is not limited to this, and the cross-sectional shapes of the voltage measuring terminal insertion holes 61c and 61d may be any shape as long as the cross-sectional shape of the voltage measuring terminal insertion hole 61c and the cross-sectional shape of the voltage measuring terminal insertion hole 61d are different from each other. Moreover, the cross-sectional shape of the main body portion 71a of the stopper member 70a is the diamond shape. However, the present modification example is not limited to this, and the cross-sectional shape of the main body portion 71a of the stopper member 70a may be any shape as long as the stopper member 70a can open and close the voltage measuring terminal insertion hole 61d and prevent the heat release.

Modification Example 2

Figure 4:
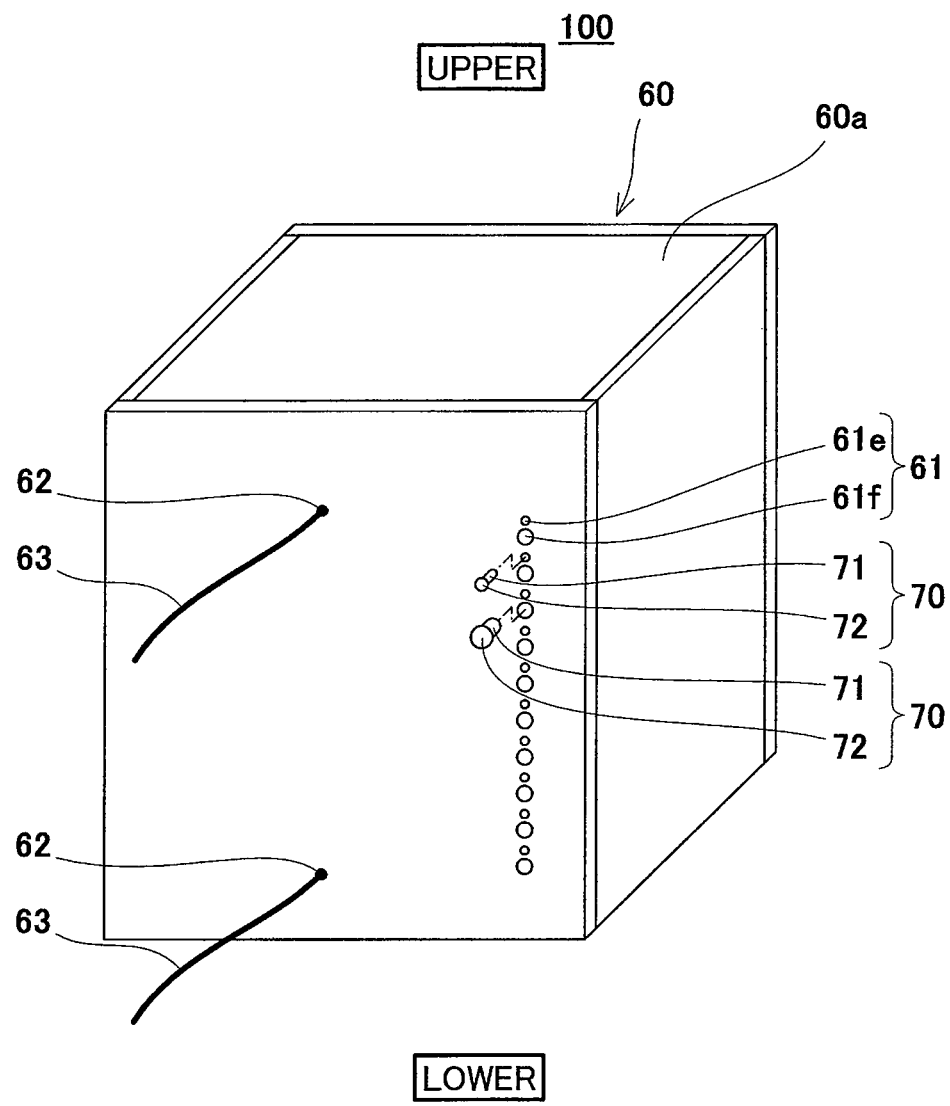
FIG. 4 is a perspective view schematically showing a schematic configuration of Modification Example 2 of the polymer electrolyte fuel cell according to Embodiment 1.

FIG. 4 is a perspective view schematically showing a schematic configuration of Modification Example 2 of the PEFC 100 according to Embodiment 1. In FIG. 4, a vertical direction of the PEFC 100 is shown as a vertical direction of the drawing.

As shown in FIG. 4, in the PEFC 100 according to Modification Example 2, the voltage measuring terminal insertion hole 61 is constituted by voltage measuring terminal insertion holes 61e and 61f which are different from each other in size (cross-sectional area). With this, it is possible to prevent the voltage measuring terminal from being mistakenly inserted into the incorrect hole when carrying out the maintenance (when measuring the voltage of each cell 10).

Moreover, the size of the cross-sectional shape of the main body portion 71 of the stopper member 70 (not shown in FIG. 4) corresponds to the size of the opening of the voltage measuring terminal insertion hole 61e or 61f. With this, the heat release from each voltage measuring terminal insertion hole 61 can be surely prevented.

Embodiment 2

Figure 5A:
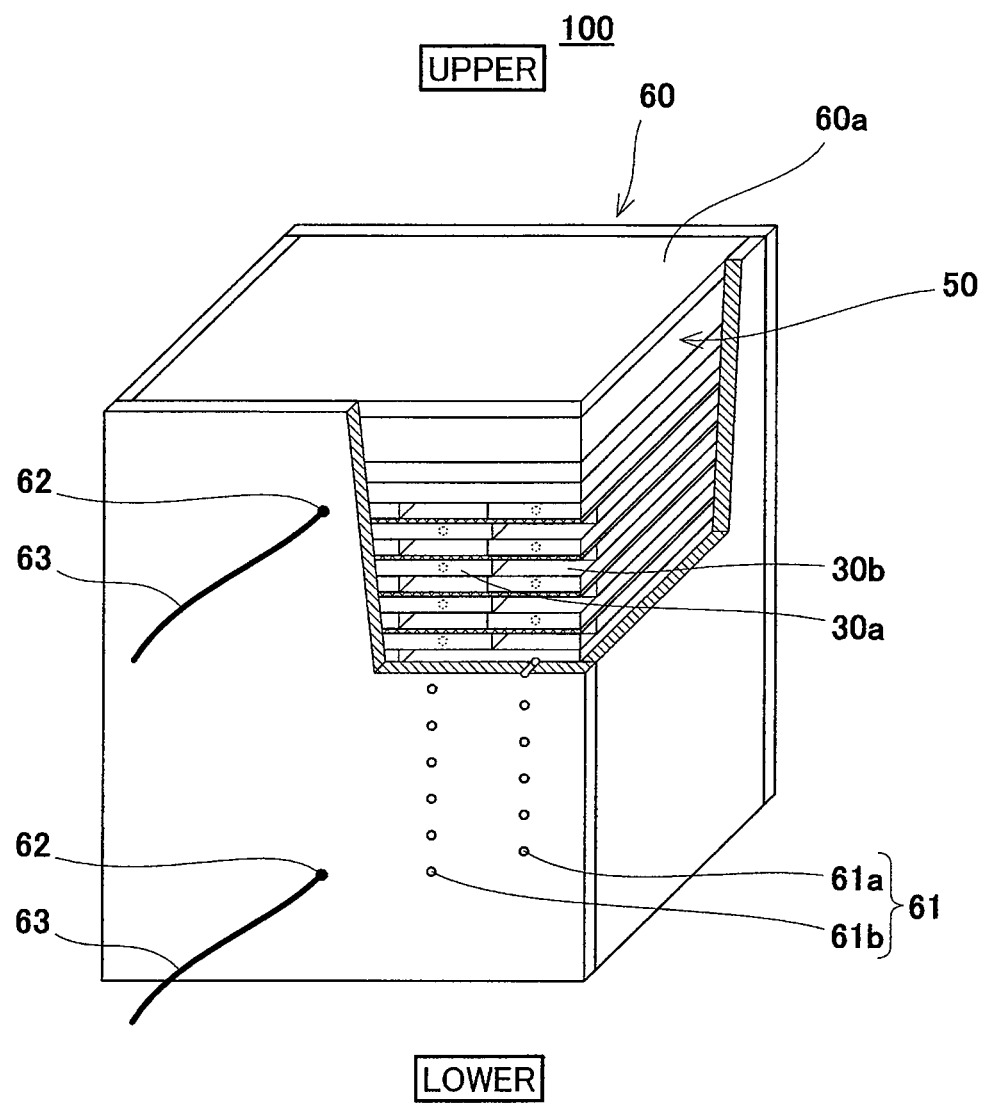
FIG. 5($a$) is a perspective view schematically showing a schematic configuration of the polymer electrolyte fuel cell according to Embodiment 2 of the present invention.
Figure 5B:
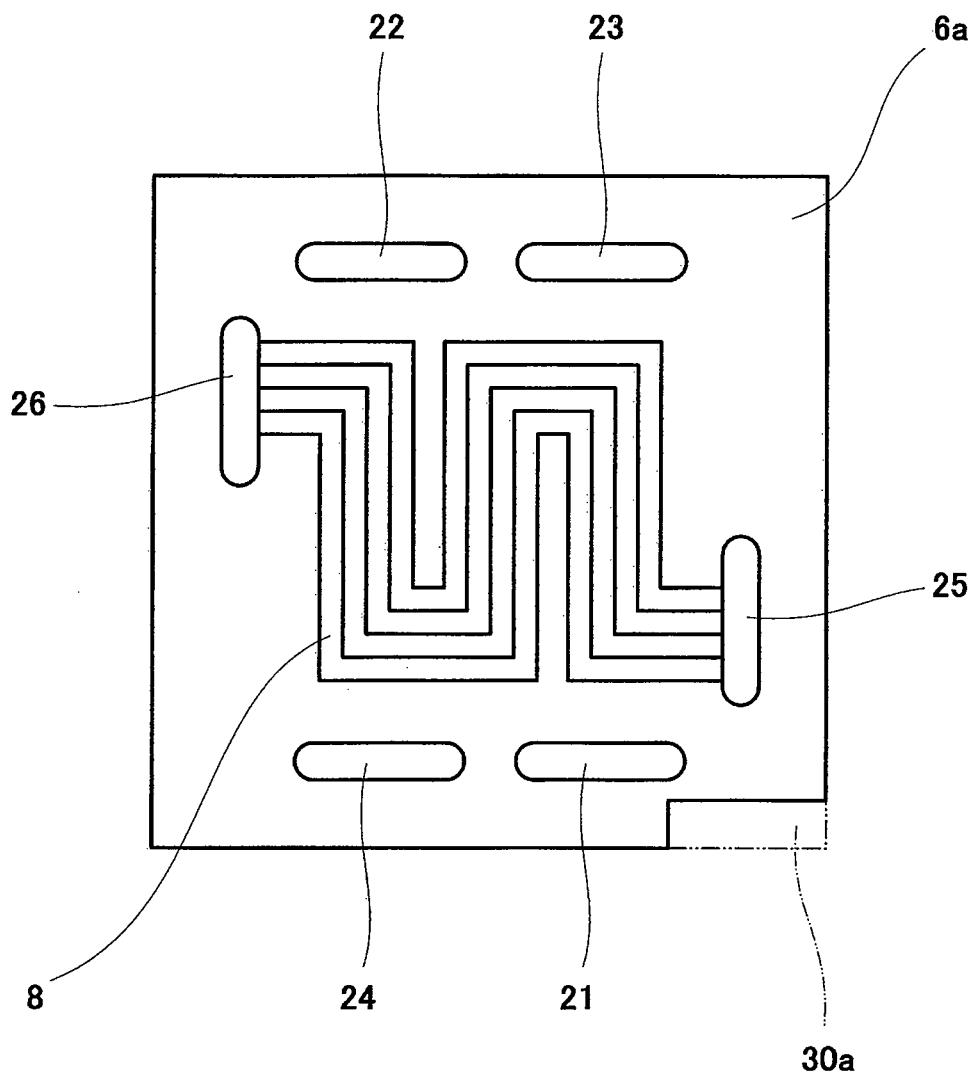
Figure 5C:
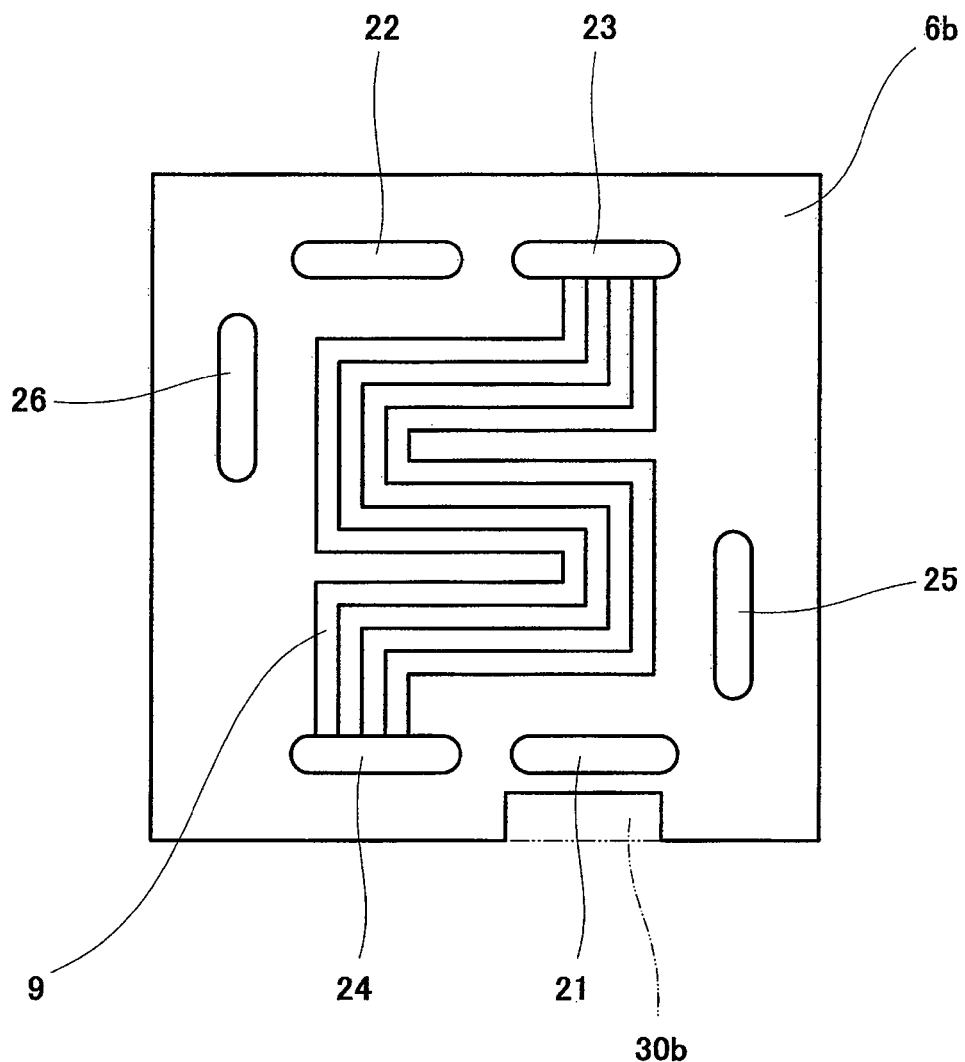

FIG. 5(a) is a perspective view schematically showing a schematic configuration of the PEFC 100 according to Embodiment 2 of the present invention. FIG. 5(b) is a front view schematically showing a schematic configuration of the anode separator 6a of the PEFC 100 shown in FIG. 5(a). FIG. 5(c) is a front view schematically showing a schematic configuration of the cathode separator 6b of the PEFC 100 shown in FIG. 5(a). In FIG. 5(a), a part of the PEFC 100 is cut away to show an internal structure thereof, and a vertical direction of the PEFC 100 is shown as a vertical direction of the drawing.

As shown in FIGS. 5(a) and 5(b), a cutout portion 30a is formed at an end portion of the anode separator 6a of the cell 10 constituting the PEFC 100 according to Embodiment 2. Herein, the cutout portion 30a is formed at one side of the plate-shaped anode separator 6a which side is opposed to the heat insulating plate 60a on which the voltage measuring terminal insertion holes 61 are formed, and the cutout portion 30a is formed such that a rectangular shape having a predetermined length from an end of the anode separator 6a is cut out.

As shown in FIGS. 5(a) and 5(c), a cutout portion 30b is formed at an end portion of the cathode separator 6b. Herein, the cutout portion 30b is formed such that a portion close to an end of one side of the cathode separator 6b which side is opposed to the heat insulating plate 60a on which the voltage measuring terminal insertion holes 61 are formed is cut out in a rectangular shape. In addition, the cutout portion 30b is formed so as not to overlap the cutout portion 30a when viewed from the stack direction of the cells 10. The length and width of each of the cutout portions 30a and 30b are suitably designed based on the length of the voltage measuring terminal and the like.

Meanwhile, the voltage measuring terminal insertion holes 61 are formed in a zigzag manner on the heat insulating plate 60a. Specifically, the voltage measuring terminal insertion holes 61a (voltage measuring terminal insertion holes corresponding to the anode separators 6a) are formed so as to overlap one another when viewed from the stack direction of the cells 10, and the voltage measuring terminal insertion holes 61b (voltage measuring terminal insertion holes corresponding to the cathode separators 6b) are formed so as to overlap one another when viewed from the stack direction of the cells 10. The voltage measuring terminal insertion hole 61a and the voltage measuring terminal insertion hole 61b are formed so as not to overlap each other when viewed from the stack direction of the cells 10 (so as to be spaced apart from each other in a horizontal direction).

With this, even if the voltage measuring terminal is obliquely inserted into the voltage measuring terminal insertion hole 61a, the voltage measuring terminal does not contact both the anode separator 6a to be measured and the cathode separator 6b which forms a pair with the anode separator 6a (which constitutes the cell 10 with the anode separator 6a). Similarly, the voltage measuring terminal inserted into the voltage measuring terminal insertion hole 61b does not contact both the cathode separator 6b to be measured and the anode separator 6a which forms a pair with the cathode separator 6b (which constitutes the cell 10 with the cathode separator 6b). On this account, it is possible to surely prevent the short-circuiting caused when one voltage measuring terminal contacts both the anode separator 6a and the cathode separator 6b constituting the cell 10.

As with the anode separator 6a, one gasket 7 contacting the inner surface of the anode separator 6a has a cutout portion (not shown) at one corner portion thereof (at an end of one side of the gasket 7 which side is opposed to the heat insulating plate 60a on which the voltage measuring terminal insertion holes 61 are formed). With this, cross leakage of the reactant gases is prevented. Moreover, the other gasket 7 contacting the inner surface of the cathode separator 6b has a cutout portion (not shown) at a position corresponding to the cutout portion of the cathode separator 6b (at a position close to an end of one side of the gasket 7 which side is opposed to the heat insulating plate 60a on which the voltage measuring terminal insertion holes 61 are formed). With this, the cross leakage of the reactant gases is prevented.

Moreover, the horizontal positions of the voltage measuring terminal insertion holes 61 formed in a zigzag manner may be any positions, and the horizontal positions of the cutout portions 30a and 30b may be any positions as long as the positions correspond to the voltage measuring terminal insertion holes 61.

Further, in the PEFC 100 according to Embodiment 1 (including the PEFCs 100 of Modification Examples 1 and 2), the voltage measuring terminal insertion holes 61 may be formed in a zigzag manner as in the PEFC 100 according to Embodiment 2.

Embodiment 3

Figure 6A:
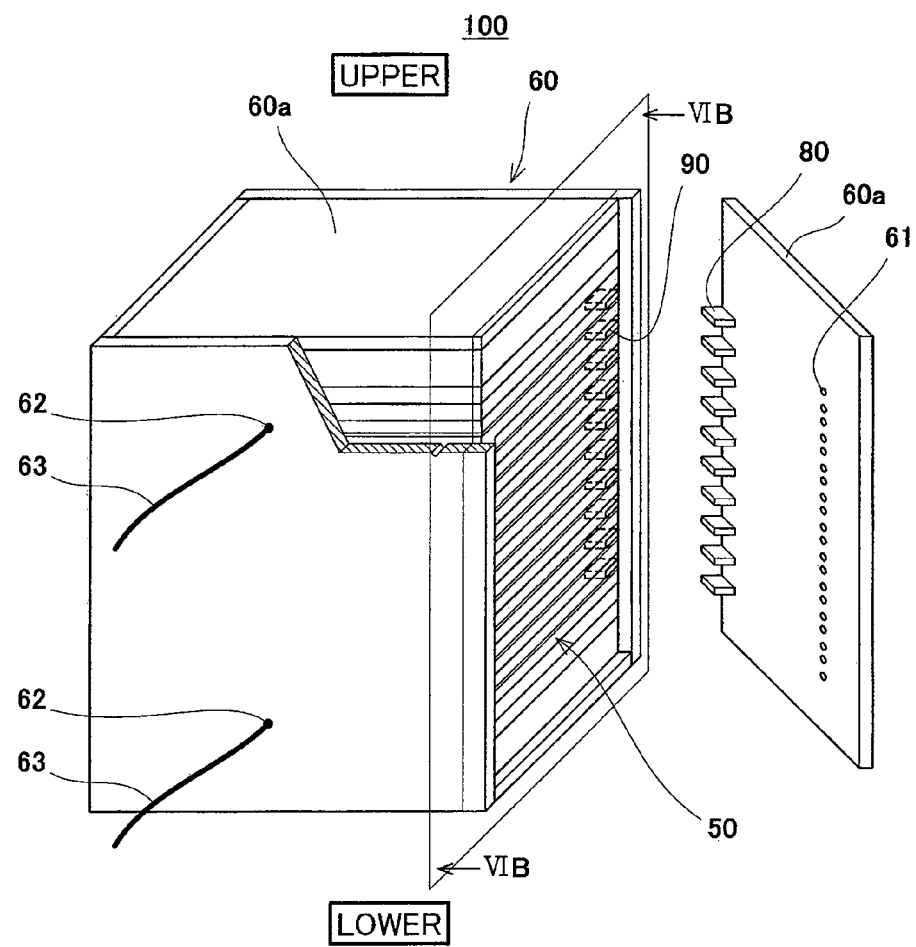
FIG. 6($a$) is a perspective view schematically showing a schematic configuration of the polymer electrolyte fuel cell according to Embodiment 3 of the present invention.
Figure 6B:
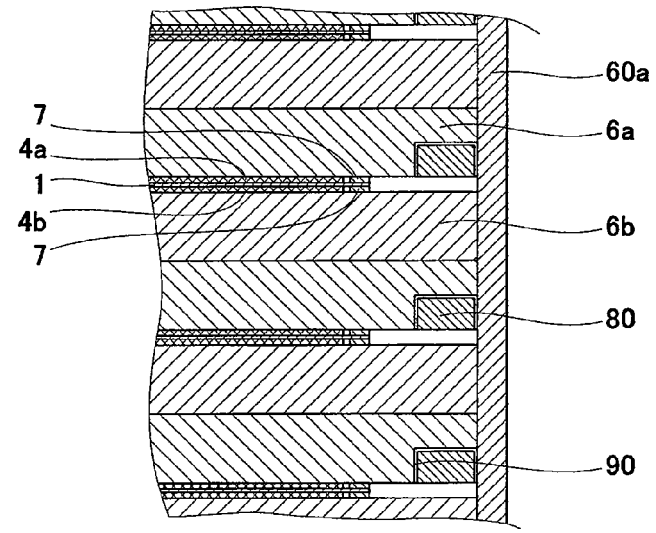

FIG. 6(a) is a perspective view schematically showing a schematic configuration of the PEFC 100 according to Embodiment 3 of the present invention. FIG. 6(b) is a cross-sectional view taken along a plane VIB shown in, FIG. 6(a). In FIG. 6(a), a vertical direction of the PEFC 100 is shown as a vertical direction of the drawing.

As shown in FIGS. 6(a) and 6(b), in the PEFC 100 according to Embodiment 3, a concave portion (hereinafter referred to as "storing concave portion") 90 is formed on an end surface of one of the separators (herein, the anode separator 6a). Herein, the cross-sectional shape of the storing concave portion 90 is a substantially rectangular shape, and the depth of the storing concave portion 90 is suitably designed such that the reactant gas and the heat medium does not leak to the outside of the PEFC 100.

Moreover, convex portions 80 projecting in the thickness direction of the heat insulating plate 60a are formed on a surface (hereinafter referred to as "inner surface"), opposed to the cell stack 50, of the heat insulating plate 60a on which the voltage measuring terminal insertion holes 61 are formed. The convex portions 80 are formed so as to be located at the same heights as the voltage measuring terminal insertion holes 61 corresponding to the anode separators 6a. Herein, the convex portion 80 is formed to have a rectangular solid shape and may be made of a material that is the same as the material, such as urethane, forming the heat insulating casing 60 and the heat insulating plate 60a.

The convex portions 80 are formed so as to be fittingly stored in the storing concave portions 90 when the cell stack 50 is covered with the heat insulating casing 60 (to be precise, the heat insulating plate 60a). With this, the position of the heat insulating plate 60a with respect to the separator can be more surely fixed. In addition, the voltage measuring terminal insertion hole 61 can be surely caused to face the separator 6a or 6b of the target cell 10.

With this configuration, in the PEFC 100 according to Embodiment 3, the position of the heat insulating plate 60a with respect to the cell stack 50 can be more surely fixed. In addition, the voltage measuring terminal insertion hole 61 can be surely caused to face the end surface of the separator 6a or 6b of the target cell 10.

In a case where the heat insulating casing 60 is constituted by the heat insulating plates 60a to have a tubular shape, covering the cell stack 50 becomes difficult due to the convex portions 80. However, in this case, the heat insulating plate 60a is formed to have elasticity, and the cell stack 50 is covered with the heat insulating plate 60a by stretching the heat insulating plate 60a in a direction perpendicular to the stack direction of the cells 10. Thus, the above problem can be solved.

Embodiment 4

Figure 7:
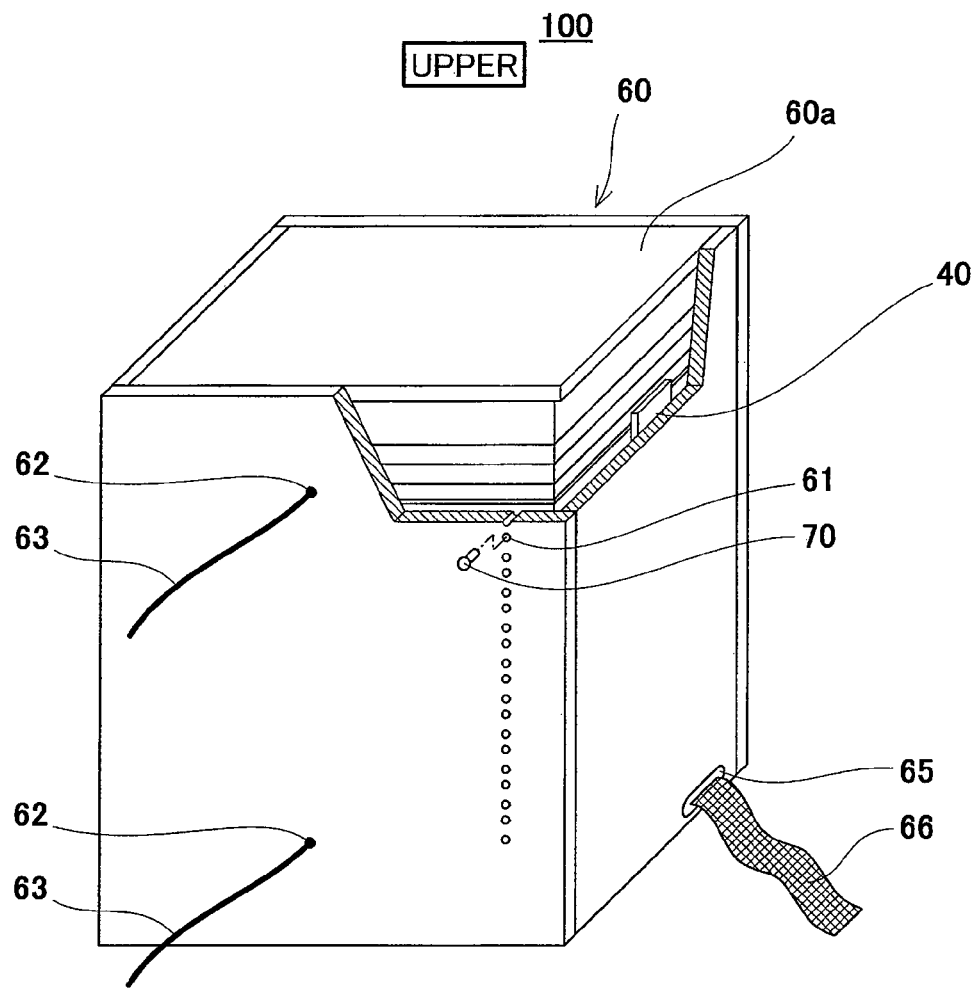
FIG. 7 is a perspective view schematically showing a schematic configuration of the polymer electrolyte fuel cell according to Embodiment 4 of the present invention.

FIG. 7 is a perspective view schematically showing a schematic configuration of the PEFC 100 according to Embodiment 4 of the present invention. In FIG. 7, a part of the PEFC 100 is cut away to show an internal structure thereof, and a vertical direction of the PEFC 100 is shown as a vertical direction of the drawing.

As shown in FIG. 7, in the PEFC 100 according to Embodiment 4, a fuel cell monitoring device 40 configured to measure the voltage of each cell 10 is additionally provided between the inner surface of the heat insulating member 60 and the peripheral surface of the cell stack 50. The fuel cell monitoring device 40 is constituted by a known voltage measuring device, and is disposed on one surface of the peripheral surface of the cell stack body 51 other than the surface opposed to the openings of the voltage measuring terminal insertion holes 61 of the heat insulating member 60.

A through hole 65 penetrating the heat insulating plate 60a in the thickness direction is formed at a lower portion of the heat insulating plate 60a opposed to the end surface of the cell stack body 51 on which surface the fuel cell monitoring device 40 is disposed. A wire 66 is inserted into the through hole 65. One end of the wire 66 is connected to the fuel cell monitoring device 40, and the other end thereof is connected to a controller, not shown. Herein, the fuel cell monitoring device 40 is disposed on one surface of the peripheral surface of the cell stack body 51 other than the surface opposed to the voltage measuring terminal insertion holes 61. However, the present embodiment is not limited to this, and the fuel cell monitoring device 40 may be disposed on any portion of the peripheral surface of the cell stack body 51 except for the vicinity of the position opposed to the voltage measuring terminal insertion holes 61. Herein, the entire fuel cell monitoring device 40 is disposed between the inner surface of the heat insulating plate 60a and the peripheral surface of the cell stack 50. However, the present embodiment is not limited to this. As disclosed in Patent Documents 2 to 4, the fuel cell monitoring device 40 may be configured such that the voltage measuring terminal thereof is disposed inside the heat insulating casing 60 and the main body portion thereof is disposed outside the heat insulating casing 60.

With this configuration, in the PEFC 100 according to Embodiment 4, by comparing a value measured by the fuel cell monitoring device 40 with a value measured by a different voltage measuring device from the fuel cell monitoring device 40 through the voltage measuring terminal inserted into the voltage terminal insertion hole 61 at the time of maintenance, whether the fuel cell monitoring device has a malfunction or not can be determined on site.

Embodiment 5

Figure 8:
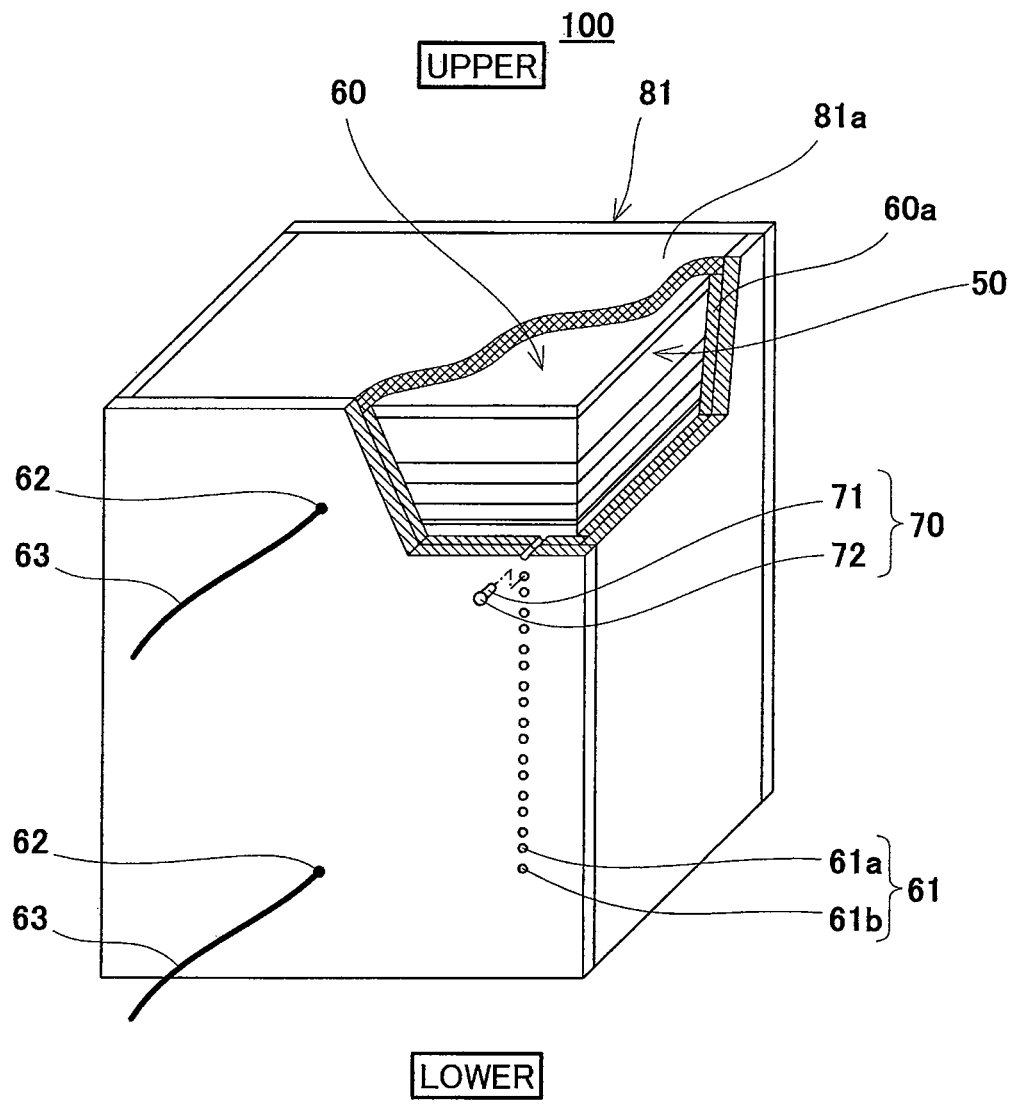
FIG. 8 is a perspective view schematically showing a schematic configuration of the PEFC according to Embodiment 5 of the present invention.

FIG. 8 is a perspective view schematically showing a schematic configuration of the PEFC according to Embodiment 5 of the present invention. In FIG. 8, a part of the PEFC is cut away to show an internal structure thereof, and a vertical direction of the PEFC is shown as a vertical direction of the drawing.

As shown in FIG. 8, the PEFC 100 according to Embodiment 5 is the same in basic configuration as the PEFC 100 according to Embodiment 1 but is different from the PEFC 100 according to Embodiment 1 in that the covering members are constituted by the heat insulating plates 60a and storing plates (storing members) 80a. Specifically, the heat insulating casing 60 is formed to cover the entire cell stack 50, and a storing casing 80 constituted by six storing plates 80a is formed to cover the entire heat insulating casing 60. To store and protect the entire PEFC 100, it is preferable that the storing plate 80a have a predetermined strength and be made of a metal, such as SUS.

Moreover, a pair of through holes 62 are formed on each of the heat insulating casing 60 and the storing casing 80. Each through hole 62 penetrates the heat insulating plate 60a or the storing plate 80a in the thickness direction. The through hole 62 of the heat insulating casing 60 and the through hole 62 of the storing casing 80 are communicated with each other. The electric wire 63 is inserted into the through hole 62. One end of the electric wire 63 is connected to the first or second current collector 53a or 53b constituting the cell stack 50. With this, the electric power generated by the PEFC 100 can be supplied to the outside via the electric wire 63.

To prevent the heat release from the PEFC 100 via the through hole 62 and the electric wire 63, a portion of the electric wire 63 which portion extends from the through hole 62 is heat-insulated by a suitable means.

Further, the voltage measuring terminal insertion holes 61 are formed on the heat insulating casing 60 (to be precise, the heat insulating plate 60a) covering the peripheral surface of the cell stack 50 and the storing casing 80 (to be precise, the storing plate 80a) covering the peripheral surface of the heat insulating casing 60 so as to be located at positions corresponding to the anode separators 6a and the cathode separators 6b constituting the cells 10.

Specifically, the voltage measuring terminal insertion holes 61a corresponding to the anode separators 6a and the voltage measuring terminal insertion holes 61b corresponding to the cathode separators 6b (these holes are referred to as "voltage measuring terminal insertion holes 61") are formed to penetrate the heat insulating plate 60a and the storing plate 80a in the thickness direction of the heat insulating plate 60a and the storing plate 80a. The voltage measuring terminal insertion holes 61a and the voltage measuring terminal insertion holes 61b are arranged in the stack direction of the cells 10 (the holes 61a and 61b overlap one another when viewed from the stack direction of the cells 10) and are provided at predetermined intervals.

The voltage measuring terminal insertion holes 61 are formed on the heat insulating plate 60a and the storing plate 80a such that the number of voltage measuring terminal insertion holes 61 corresponds to the number of stacked cells 10 (for example, 10 to 200). The voltage measuring terminal insertion holes 61 formed on the heat insulating plate 60a and the voltage measuring terminal insertion holes 61 formed on the storing plate 80a are arranged at predetermined intervals such that: when the heat insulating plates 60a cover the peripheral surface of the cell stack 50, and the storing plates 80a cover the peripheral surface of the heat insulating casing 60, the voltage measuring terminal insertion hole 61 formed on the heat insulating plate 60a and the voltage measuring terminal insertion hole 61 formed on the storing plate 80a are communicated with each other; and the opening of the voltage measuring terminal insertion hole 61 is opposed to the end surface of the anode separator 6a or the cathode separator 6b of the cell 10.

With this configuration, the PEFC 100 according to Embodiment 5 can measure the voltage of each cell 10 by inserting the voltage measuring terminal of the voltage measuring device into the voltage measuring terminal insertion hole 61 without detaching the heat insulating casing 60 or the storing casing 80 covering the cell stack 50. Therefore, the maintenance of the PEFC 100 can be efficiently and surely carried out. Moreover, as with the PEFC 100 according to Embodiment 1, the voltage measuring terminal insertion holes 61 are closed by the stopper members 70 at any time other than the time of the maintenance, and the voltage measuring terminals are not inserted into the voltage terminal insertion holes 61. Therefore, it is possible to prevent the heat release (loss) from the PEFC 100 via the voltage measuring terminal insertion holes 61.

Embodiment 6

Figure 9:
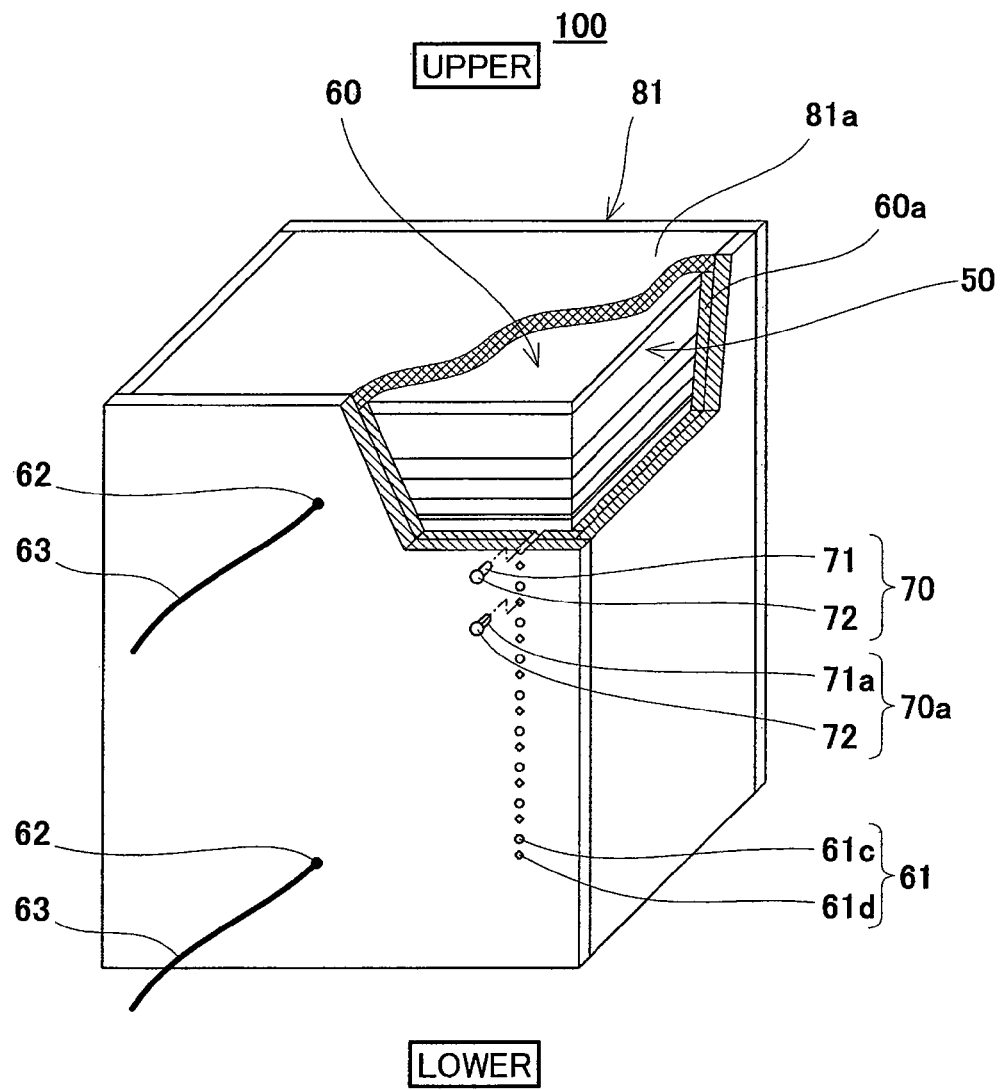
FIG. 9 is a perspective view schematically showing a schematic configuration of the PEFC according to Embodiment 6 of the present invention.

FIG. 9 is a perspective view schematically showing a schematic configuration of the PEFC according to Embodiment 6 of the present invention. In FIG. 9, a part of the PEFC is cut away to show an internal structure thereof, and a vertical direction of the PEFC is shown as a vertical direction of the drawing.

As shown in FIG. 9, the PEFC 100 according to Embodiment 6 is the same in basic configuration as the PEFC 100 according to Embodiment 5 but is different from the PEFC 100 according to Embodiment 5 in that the voltage measuring terminal insertion hole 61 is constituted by: the voltage measuring terminal insertion holes 61c which is a through hole formed on each of the heat insulating plate 60a and the storing plate 80a and has a circular cross-sectional shape; and the voltage measuring terminal insertion hole 61d which is a through hole formed on each of the heat insulating plate 60a and the storing plate 80a and has a diamond cross-sectional shape.

Specifically, a pair of the voltage measuring terminal insertion holes 61c and 61d are arranged in the stack direction of the cells 10 in the cell stack body 51, and are formed at positions respectively corresponding to the anode separator 6a and the cathode separator 6b (herein, the voltage measuring terminal insertion hole 61c is formed at a position corresponding to the anode separator 6a, and the voltage measuring terminal insertion hole 61d is formed at a position corresponding to the cathode separator 6b). With this, it is possible to prevent the voltage measuring terminal from being mistakenly inserted into the incorrect hole when carrying out the maintenance (when measuring the voltage of each cell 10).

Moreover, the PEFC 100 according to Embodiment 6 is different from the PEFC 100 according to Embodiment 5 in that the cross-sectional shape of the main body portion 71a of the stopper member 70a closing the voltage measuring terminal insertion hole 61d is formed in a diamond shape that is the same as the cross-sectional shape of the voltage measuring terminal insertion hole 61d. Herein, the cross-sectional shapes of the voltage measuring terminal insertion holes 61c and 61d are a circular shape and a diamond shape. However, the present embodiment is not limited to this, and the cross-sectional shapes of the voltage measuring terminal insertion holes 61c and 61d may be any shape as long as the cross-sectional shape of the voltage measuring terminal insertion hole 61c and the cross-sectional shape of the voltage measuring terminal insertion hole 61d are different from each other. Moreover, the cross-sectional shape of the main body portion 71a of the stopper member 70a is a diamond shape. However, the present embodiment is not limited to this, and the cross-sectional shape of the main body portion 71a of the stopper member 70a may be any shape as long as the stopper member 70a can close and open the voltage measuring terminal insertion hole 61d and prevent the heat release.

The PEFC 100 according to Embodiment 6 configured as above can obtain the same operational advantages as the PEFC 100 according to Embodiment 5, and it is possible to prevent the voltage measuring terminal from being mistakenly inserted into the incorrect hole when carrying out the maintenance (when measuring the voltage of each cell 10).

Embodiment 7

Figure 10:
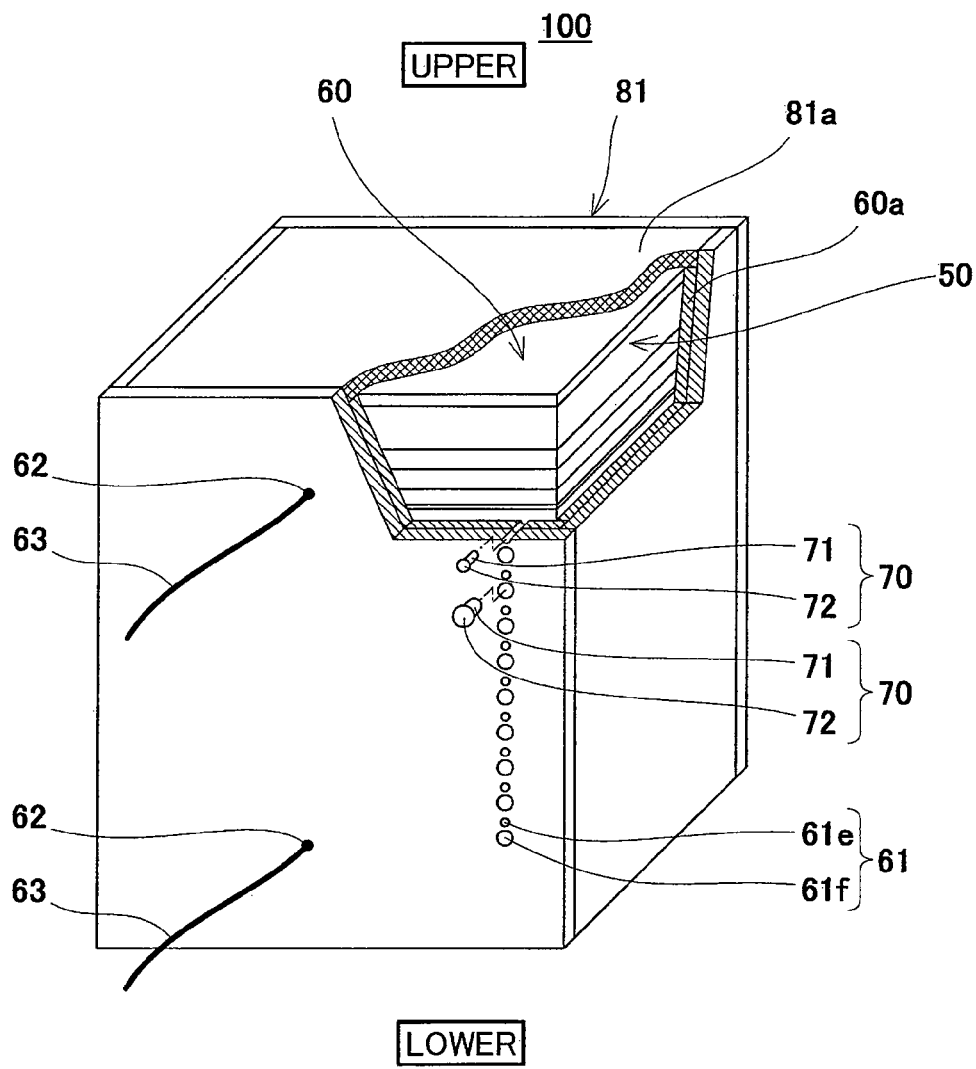
FIG. 10 is a perspective view schematically showing a schematic configuration of the PEFC according to Embodiment 7 of the present invention.

FIG. 10 is a perspective view schematically showing a schematic configuration of the PEFC according to Embodiment 7 of the present invention. In FIG. 10, a part of the PEFC is cut away to show an internal structure thereof, and a vertical direction of the PEFC is shown as a vertical direction of the drawing.

As shown in FIG. 10, the PEFC 100 according to Embodiment 7 is the same in basic configuration as the PEFC 100 according to Embodiment 5 but is different from the PEFC 100 according to Embodiment 5 in that the voltage measuring terminal insertion hole 61 is constituted by the voltage measuring terminal insertion holes 61e and 61f which are different from each other in size (cross-sectional area). With this, it is possible to prevent the voltage measuring terminal from being mistakenly inserted into the incorrect hole when carrying out the maintenance (when measuring the voltage of each cell 10).

Moreover, the size of the cross-sectional shape of the main body portion 71 of the stopper member 70 (not shown in FIG. 10) corresponds to the size of the opening of the voltage measuring terminal insertion hole 61e or 61f. With this, the heat release from each voltage measuring terminal insertion hole 61 can be surely prevented.

The PEFC 100 according to Embodiment 7 configured as above can obtain the same operational advantages as the PEFC 100 according to Embodiment 5, and it is possible to prevent the voltage measuring terminal from being mistakenly inserted into the incorrect hole when carrying out the maintenance (when measuring the voltage of each cell 10).

Embodiment 8

Figure 11:
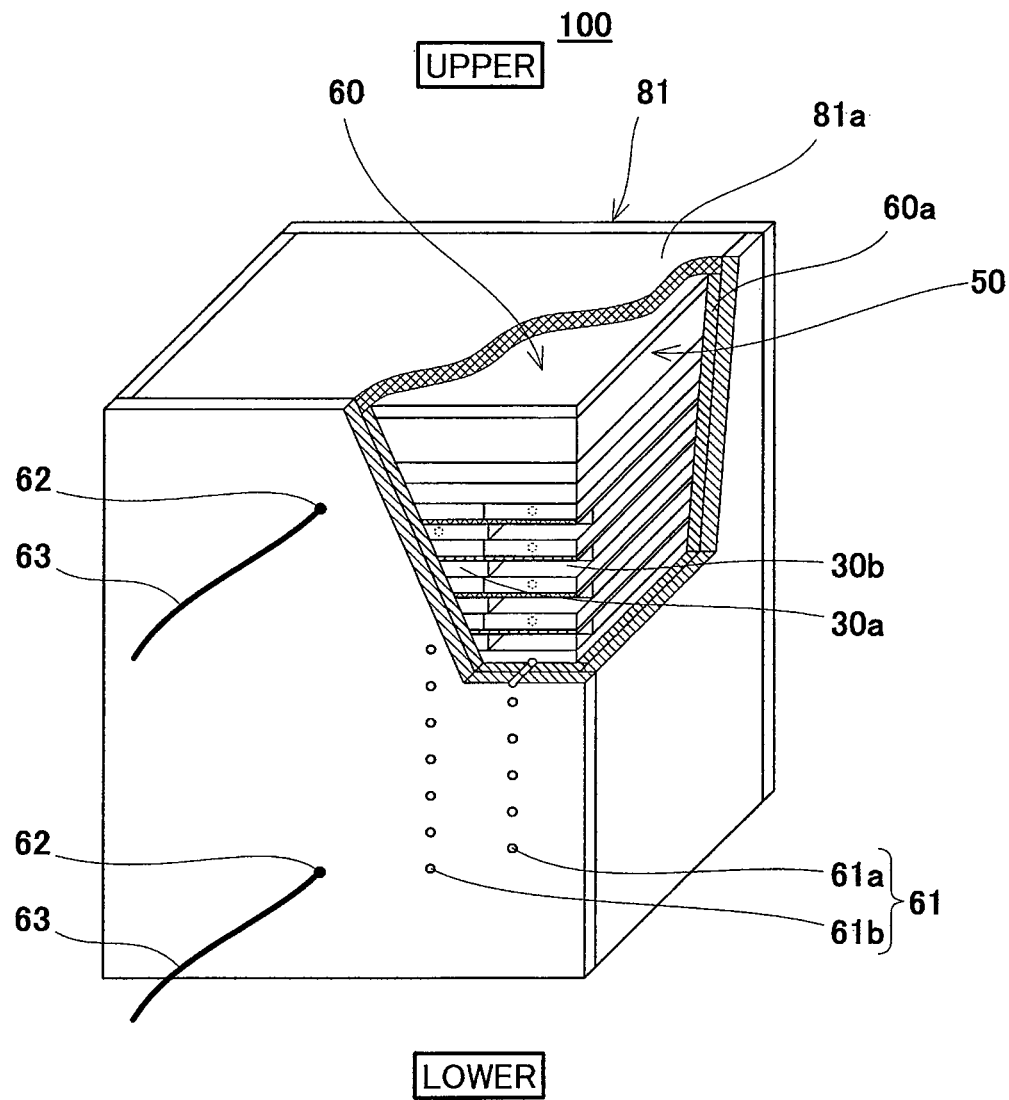
FIG. 11 is a perspective view schematically showing a schematic configuration of the PEFC according to Embodiment 8 of the present invention.

FIG. 11 is a perspective view schematically showing a schematic configuration of the PEFC according to Embodiment 8. In FIG. 11, a part of the PEFC is cut away to show an internal structure thereof, and a vertical direction of the PEFC is shown as a vertical direction of the drawing.

As shown in FIG. 11, the PEFC 100 according to Embodiment 8 is the same in basic configuration as the PEFC 100 according to Embodiment 2 but is different from the PEFC 100 according to Embodiment 2 in that the storing casing 80 constituted by six storing plates 80a is disposed to cover the entire heat insulating casing 60.

Moreover, the PEFC 100 according to Embodiment 8 is different from the PEFC 100 according to Embodiment 2 in that: a pair of through holes 62 are formed on each of the heat insulating casing 60 and the storing casing 80; each through hole 62 penetrates the heat insulating plate 60a or the storing plate 80a in the thickness direction; and the through hole 62 of the heat insulating casing 60 and the through hole 62 of the storing casing 80 are communicated with each other.

Further, the PEFC 100 according to Embodiment 8 is different from the PEFC 100 according to Embodiment 2 in that the voltage measuring terminal insertion holes 61 are formed on the heat insulating plate 60a and the storing plate 80a. Specifically, the voltage measuring terminal insertion holes 61a (voltage measuring terminal insertion holes corresponding to the anode separators 6a) are formed on the heat insulating plate 60a so as to overlap one another when viewed from the stack direction of the cells 10 and formed on the storing plate 80a so as to overlap one another when viewed from the stack direction of the cells 10. The voltage measuring terminal insertion holes 61b (voltage measuring terminal insertion holes corresponding to the cathode separators 6b) are formed on the heat insulating plate 60a so as to overlap one another when viewed from the stack direction of the cells 10 and formed on the storing plate 80a so as to overlap one another when viewed from the stack direction of the cells 10. The voltage measuring terminal insertion hole 61a and the voltage measuring terminal insertion hole 61b are formed so as not to overlap each other when viewed from the stack direction of the cells 10 (so as to be spaced apart from each other in a horizontal direction).

The PEFC 100 according to Embodiment 8 configured as above obtains the same operational advantages as the PEFC 100 according to Embodiment 2.

Embodiment 9

Figure 12:
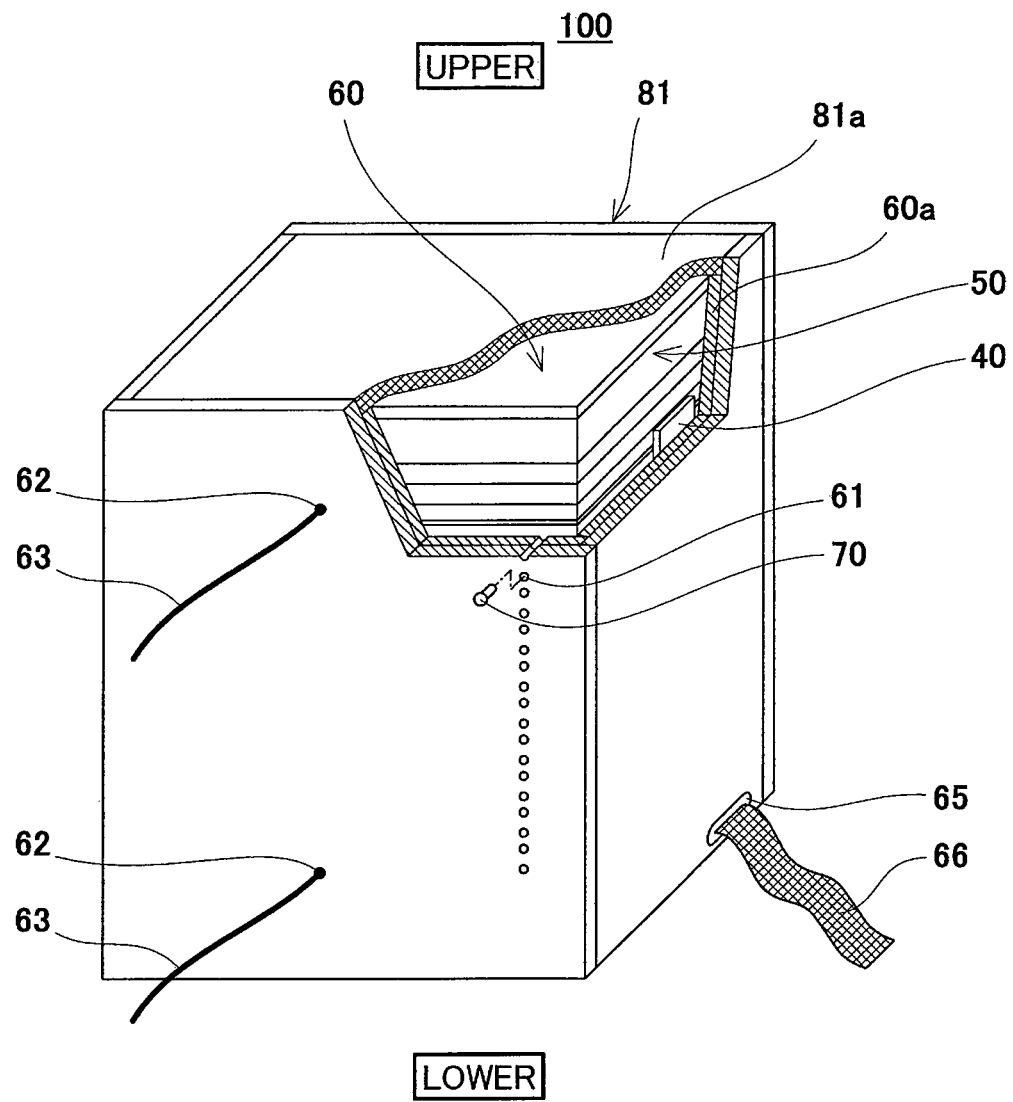
FIG. 12 is a perspective view schematically showing a schematic configuration of the PEFC according to Embodiment 9 of the present invention.

FIG. 12 is a perspective view schematically showing a schematic configuration of the PEFC according to Embodiment 9. In FIG. 12, a part of the PEFC is cut away to show an internal structure thereof, and a vertical direction of the PEFC is shown as a vertical direction of the drawing.

As shown in FIG. 12, the PEFC 100 according to Embodiment 9 is the same in basic configuration as the PEFC 100 according to Embodiment 3 but is different from the PEFC 100 according to Embodiment 3 in that: the storing casing 80 constituted by six storing plates 80a is disposed to cover the entire heat insulating casing 60; a pair of the through holes 62 are formed on each of the heat insulating plate 60a and the storing plate 80a, each through hole 62 penetrates the heat insulating plate 60a or the storing plate 80a in the thickness direction, and the through hole 62 of the heat insulating plate 60a and the through hole 62 of the storing plate 80a are communicated with each other; and the voltage measuring terminal insertion holes 61 are formed on the heat insulating plate 60a and the storing plate 80a.

The PEFC 100 according to Embodiment 9 configured as above can obtain the same operational advantages as the PEFC 100 according to Embodiment 3.

Embodiment 10

Figure 13:
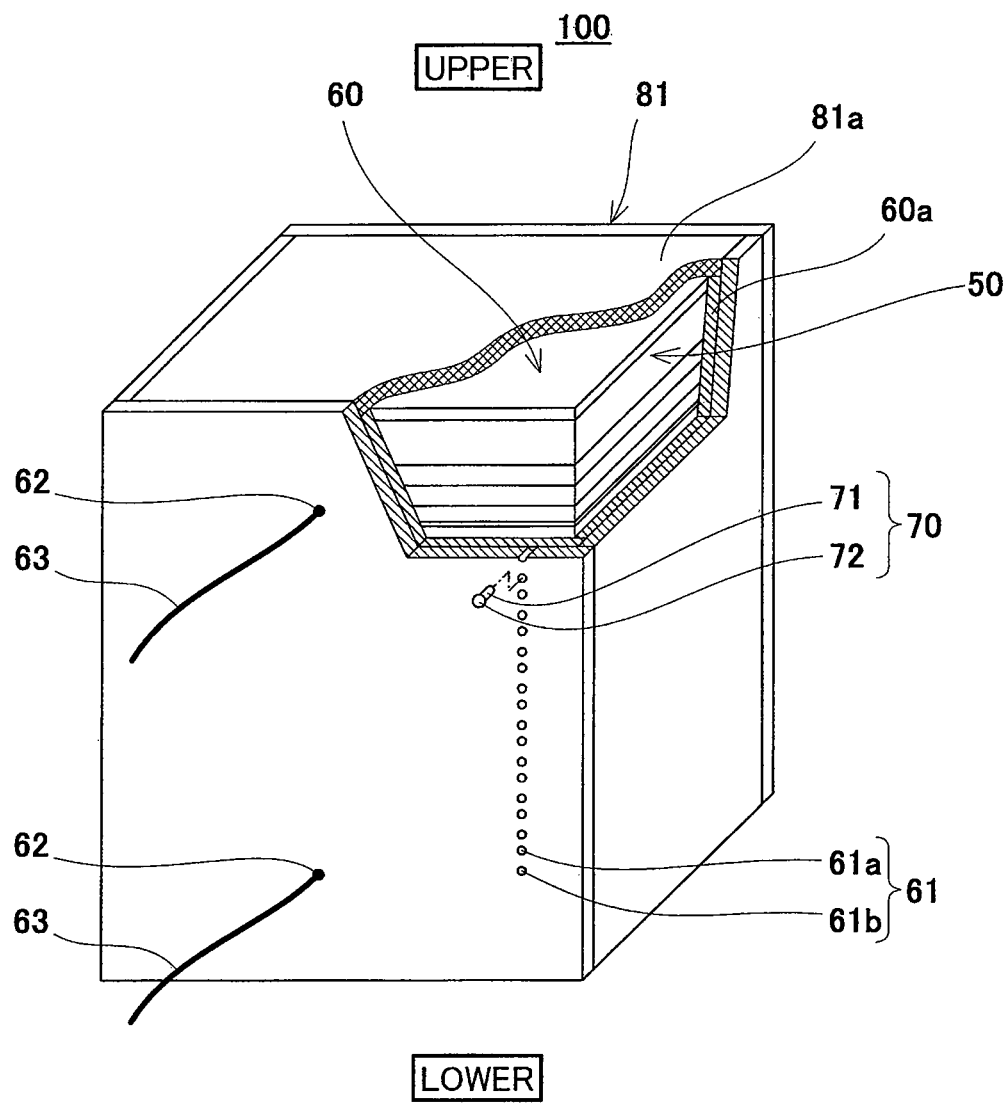
FIG. 13 is a perspective view schematically showing a schematic configuration of the PEFC according to Embodiment 10 of the present invention.

FIG. 13 is a perspective view schematically showing a schematic configuration of the PEFC according to Embodiment 10. In FIG. 13, a part of the PEFC is cut away to show an internal structure thereof, and a vertical direction of the PEFC is shown as a vertical direction of the drawing.

As shown in FIG. 13, the PEFC 100 according to Embodiment 10 is the same in basic configuration as the PEFC 100 according to Embodiment 5 but is different from the PEFC 100 according to Embodiment 5 in that: the heat insulating plate 60a is made of such a material (for example, urethane) that a through hole can be formed by plunging the voltage measuring terminal into the heat insulating plate 60a; and the voltage measuring terminal insertion holes 61 are not formed on the heat insulating plate 60a.

In accordance with the PEFC 100 according to Embodiment 10 configured as above, when carrying out the maintenance (when measuring the voltage of each cell 10), without detaching the heat insulating casing 60 or the storing casing 80 covering the cell stack 50, the voltage measuring terminal is inserted into the voltage measuring terminal insertion hole 61 formed on the storing plate 80a and is plunged into the heat insulating plate 60a to open a through hole on the heat insulating plate 60a, and a tip end of the voltage measuring terminal is caused to contact the anode separator 6a or the cathode separator 6b. Thus, the voltage of each cell 10 can be measured. Therefore, the maintenance can be further efficiently and surely carried out.

As with the PEFC 100 according to Embodiment 5, the voltage measuring terminal insertion holes 61 are closed by the stopper members 70 at any time other than the time of the maintenance, and the voltage measuring terminals are not inserted into the voltage terminal insertion holes 61. Therefore, it is possible to prevent the heat release (loss) from the PEFC 100 via the voltage measuring terminal insertion holes 61. To prevent the heat release (loss) from the PEFC 100 without closing the voltage measuring terminal insertion holes 61 by the stopper members 70, it is preferable that the heat insulating plate 60a be made of such a material that the through hole formed by plunging the voltage measuring terminal into the heat insulating plate 60a closes by pulling out the voltage measuring terminal from the through hole of the heat insulating plate 60a.

Embodiment 11

Figure 14:
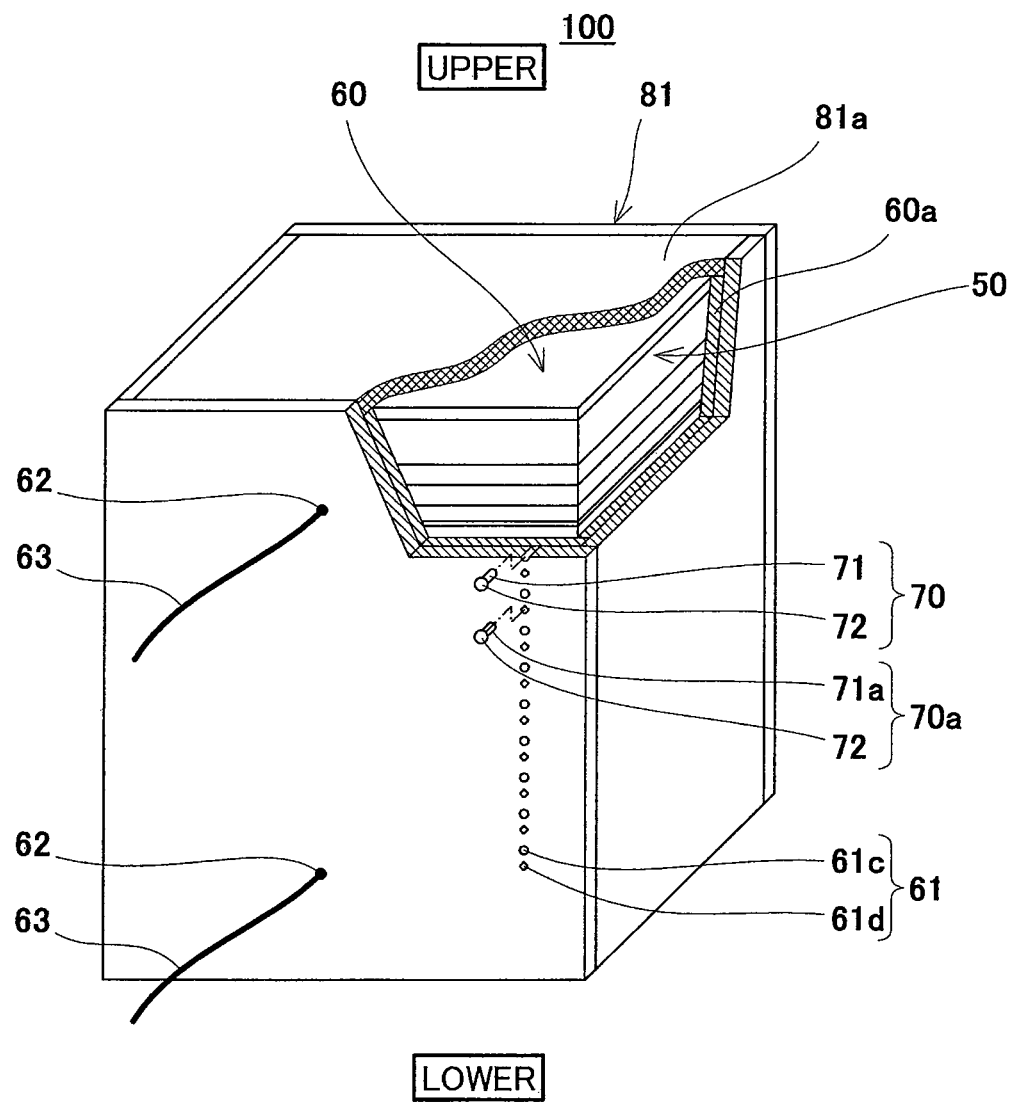
FIG. 14 is a perspective view schematically showing a schematic configuration of the PEFC according to Embodiment 11 of the present invention.

FIG. 14 is a perspective view schematically showing a schematic configuration of the PEFC according to Embodiment 11. In FIG. 14, a part of the PEFC is cut away to show an internal structure thereof, and a vertical direction of the PEFC is shown as a vertical direction of the drawing.

As shown in FIG. 14, the PEFC 100 according to Embodiment 11 is the same in basic configuration as the PEFC 100 according to Embodiment 6 but is different from the PEFC 100 according to Embodiment 6 in that: the heat insulating plate 60a is made of such a material (for example, urethane) that the through hole is formed by plunging the voltage measuring terminal into the heat insulating plate 60a; and the voltage measuring terminal insertion holes 61 are not formed on the heat insulating plate 60a.

In accordance with the PEFC 100 according to Embodiment 11 configured as above, when carrying out the maintenance (when measuring the voltage of each cell 10), without detaching the heat insulating casing 60 or the storing casing 80 covering the cell stack 50, the voltage measuring terminal is inserted into the voltage measuring terminal insertion hole 61 formed on the storing plate 80*a* and is plunged into the heat insulating plate 60*a* to open a through hole on the heat insulating plate 60*a*, and the tip end of the voltage measuring terminal is caused to contact the anode separator 6*a* or the cathode separator 6*b*. Thus, the voltage of each cell 10 can be measured. In addition, since the voltage measuring terminal insertion hole 61 is constituted by the voltage measuring terminal insertion hole 61*c* having a circular cross-sectional shape and the voltage measuring terminal insertion hole 61*d* that is a through hole having a diamond cross-sectional shape, it is possible to prevent the voltage measuring terminal from being mistakenly inserted into the incorrect hole. Therefore, the maintenance can be further efficiently and surely carried out.

To prevent the heat release (loss) from the PEFC 100 without closing the voltage measuring terminal insertion hole 61 by the stopper member 70 or 70*a*, it is preferable that the heat insulating plate 60*a* be made of such a material that the through hole formed by plunging the voltage measuring terminal into the heat insulating plate 60*a* closes by pulling out the voltage measuring terminal from the through hole of the heat insulating plate 60*a*.

Embodiment 12

Figure 15:
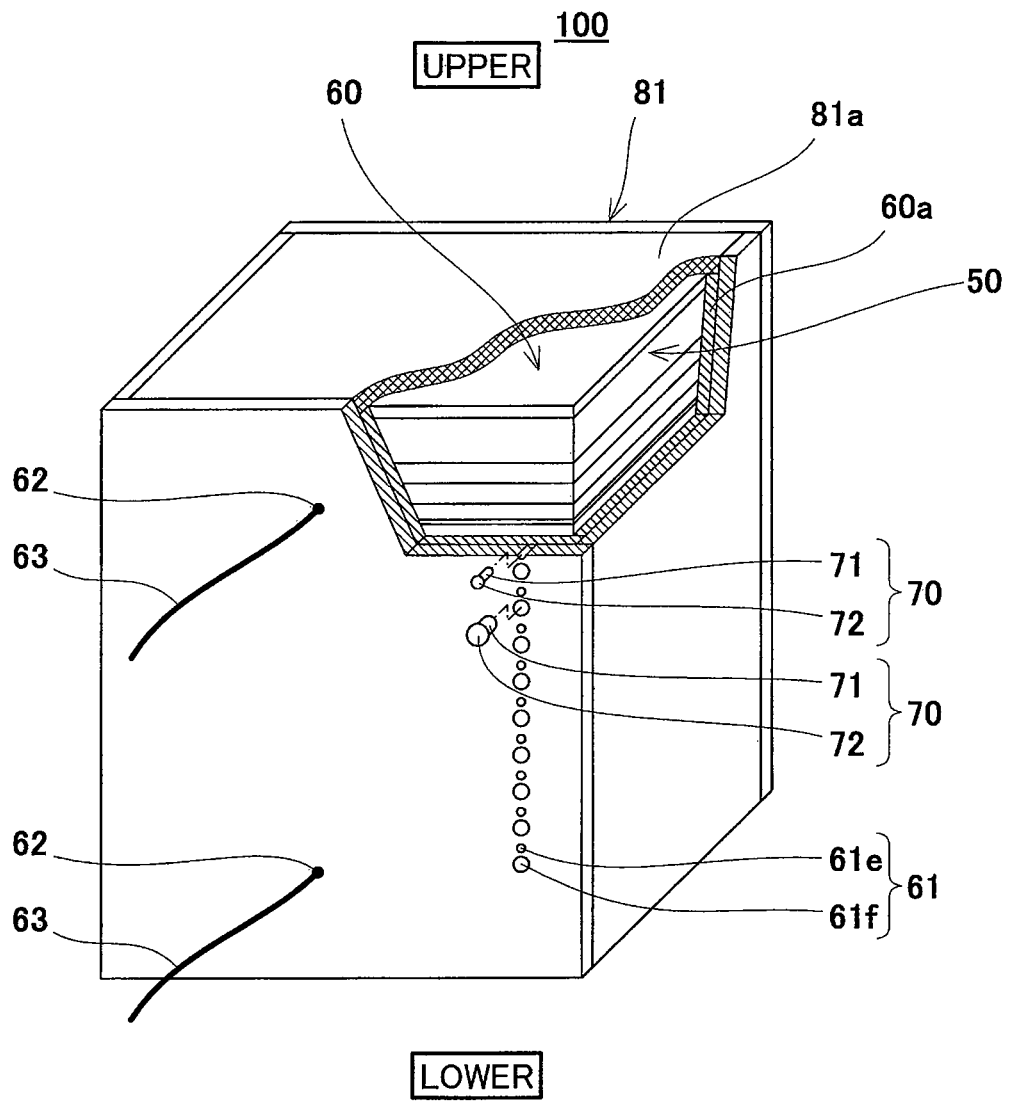
FIG. 15 is a perspective view schematically showing a schematic configuration of the PEFC according to Embodiment 12 of the present invention.

FIG. 15 is a perspective view schematically showing a schematic configuration of the PEFC according to Embodiment 12. In FIG. 15, a part of the PEFC is cut away to show an internal structure thereof, and a vertical direction of the PEFC is shown as a vertical direction of the drawing.

As shown in FIG. 15, the PEFC 100 according to Embodiment 12 is the same in basic configuration as the PEFC 100 according to Embodiment 7 but is different from the PEFC 100 according to Embodiment 7 in that: the heat insulating plate 60*a* is made of such a material (for example, urethane) that the through hole is formed by plunging the voltage measuring terminal into the heat insulating plate 60*a*; and the voltage measuring terminal insertion holes 61 are not formed on the heat insulating plate 60*a*.

In accordance with the PEFC 100 according to Embodiment 12 configured as above, when carrying out the maintenance (when measuring the voltage of each cell 10), without detaching the heat insulating casing 60 or the storing casing 80 covering the cell stack 50, the voltage measuring terminal is inserted into the voltage measuring terminal insertion hole 61 formed on the storing plate 80*a* and is plunged into the heat insulating plate 60*a* to open a through hole on the heat insulating plate 60*a*, and the tip end of the voltage measuring terminal is caused to contact the anode separator 6*a* or the cathode separator 6*b*. Thus, the voltage of each cell 10 can be measured. In addition, since the voltage measuring terminal insertion hole 61 is constituted by the voltage measuring terminal insertion holes 61*e* and 61*f* which are different from each other in size (cross-sectional area), it is possible to prevent the voltage measuring terminal from being mistakenly inserted into the incorrect hole. Therefore, the maintenance can be further efficiently and surely carried out.

To prevent the heat release (loss) from the PEFC 100 without closing the voltage measuring terminal insertion holes 61 by the stopper members 70, it is preferable that the heat insulating plate 60*a* be made of such a material that the through hole formed by plunging the voltage measuring terminal into the heat insulating plate 60*a* closes by pulling out the voltage measuring terminal from the through hole of the heat insulating plate 60*a*.

Embodiment 13

Figure 16:
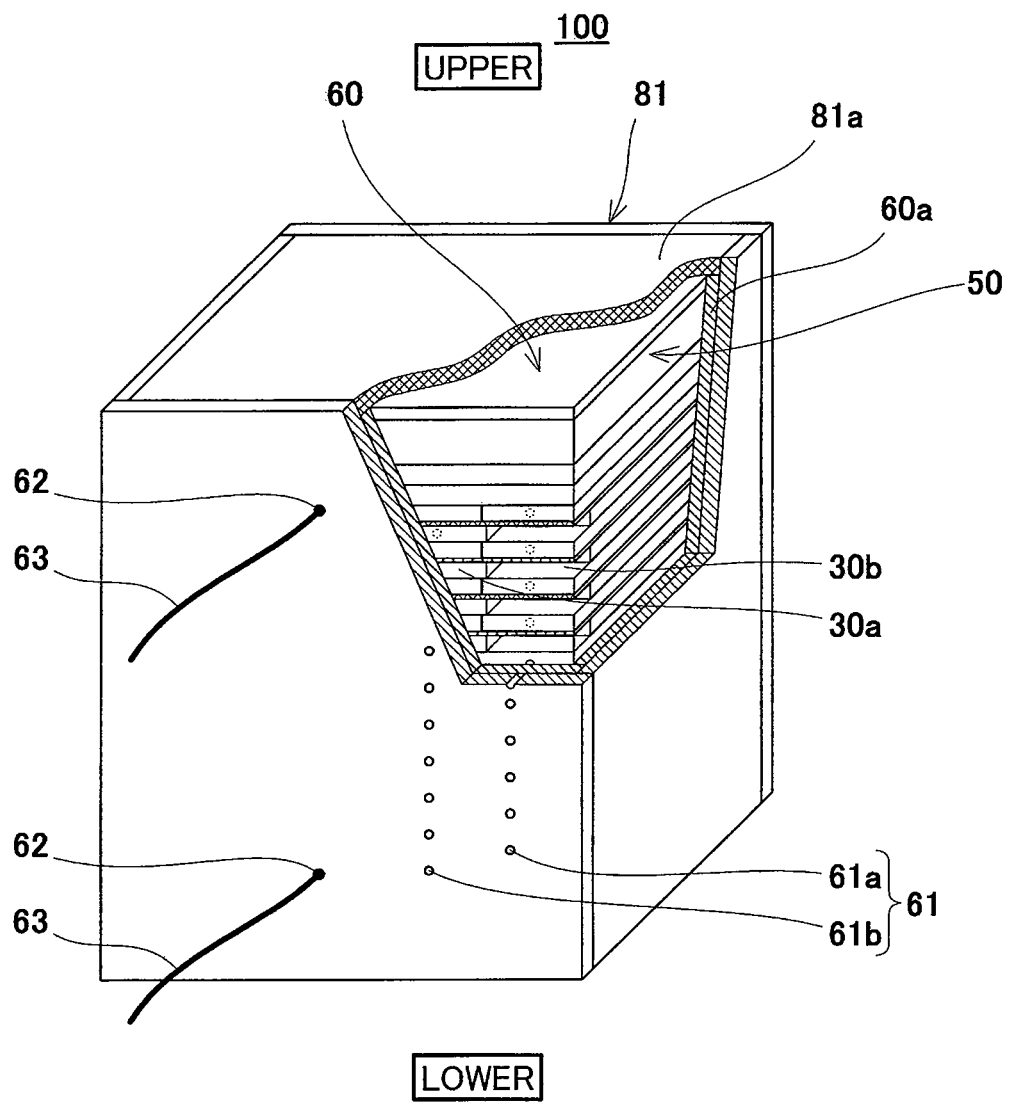
FIG. 16 is a perspective view schematically showing a schematic configuration of the PEFC according to Embodiment 13 of the present invention.

FIG. 16 is a perspective view schematically showing a schematic configuration of the PEFC according to Embodiment 13. In FIG. 16, a part of the PEFC is cut away to show an internal structure thereof, and a vertical direction of the PEFC is shown as a vertical direction of the drawing.

As shown in FIG. 16, the PEFC 100 according to Embodiment 13 is the same in basic configuration as the PEFC 100 according to Embodiment 8 but is different from the PEFC 100 according to Embodiment 7 in that: the heat insulating plate 60*a* is made of such a material (for example, urethane) that the through hole is formed by plunging the voltage measuring terminal into the heat insulating plate 60*a*; and the voltage measuring terminal insertion holes 61 are not formed on the heat insulating plate 60*a*.

In accordance with the PEFC 100 according to Embodiment 13 configured as above, when carrying out the maintenance (when measuring the voltage of each cell 10), without detaching the heat insulating casing 60 or the storing casing 80 covering the cell stack 50, the voltage measuring terminal is inserted into the voltage measuring terminal insertion hole 61 formed on the storing plate 80*a* and is plunged into the heat insulating plate 60*a* to open a through hole, and the tip end of the voltage measuring terminal is caused to contact the anode separator 6*a* or the cathode separator 6*b*. Thus, the voltage of each cell 10 can be measured. In addition, since the voltage measuring terminal insertion holes 61 are formed in a zigzag manner, it is possible to prevent the voltage measuring terminal from being mistakenly inserted into the incorrect hole. Therefore, the maintenance can be further efficiently and surely carried out.

To prevent the heat release (loss) from the PEFC 100 without closing the voltage measuring terminal insertion holes 61 by the stopper members 70 (not shown in FIG. 16), it is preferable that the heat insulating plate 60*a* be made of such a material that the through hole formed by plunging the voltage measuring terminal into the heat insulating plate 60*a* closes by pulling out the voltage measuring terminal from the through hole of the heat insulating plate 60*a*.

Embodiment 14

Figure 17:
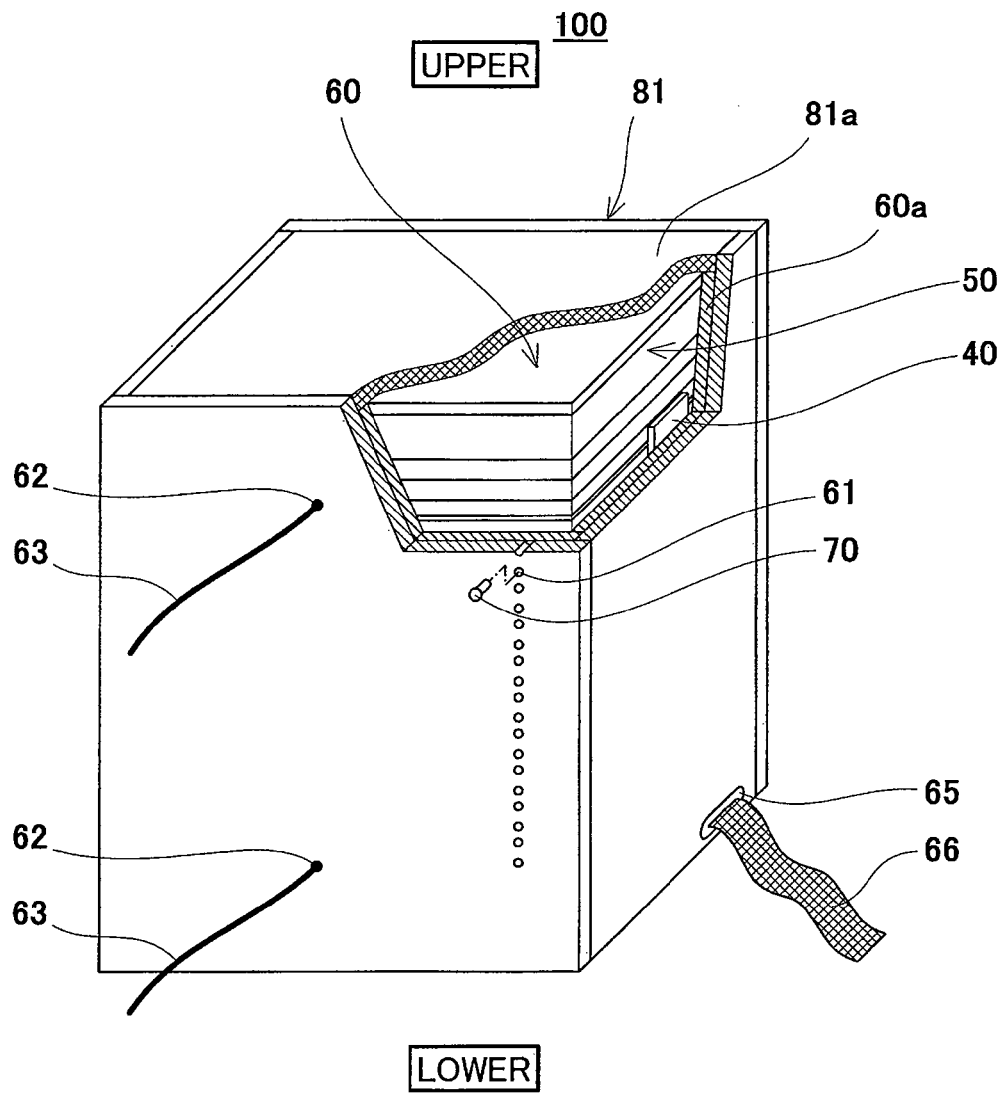
FIG. 17 is a perspective view schematically showing a schematic configuration of the PEFC according to Embodiment 14 of the present invention.

FIG. 17 is a perspective view schematically showing a schematic configuration of the PEFC according to Embodiment 14. In FIG. 17, a part of the PEFC is cut away to show an internal structure thereof, and a vertical direction of the PEFC is shown as a vertical direction of the drawing.

As shown in FIG. 17, the PEFC 100 according to Embodiment 14 is the same in basic configuration as the PEFC 100 according to Embodiment 9 but is different from the PEFC 100 according to Embodiment 9 in that: the heat insulating plate 60*a* is made of such a material (for example, urethane) that the through hole is formed by plunging the voltage measuring terminal into the heat insulating plate 60*a*; and the voltage measuring terminal insertion holes 61 are not formed on the heat insulating plate 60*a*.

In accordance with the PEFC 100 according to Embodiment 14 configured as above, when carrying out the maintenance (when measuring the voltage of each cell 10), without detaching the heat insulating casing 60 or the storing casing 80 covering the cell stack 50, the voltage measuring terminal is inserted into the voltage measuring terminal insertion hole 61 formed on the storing plate 80a and is plunged into the heat insulating plate 60a to open a through hole on the heat insulating plate 60a, and the tip end of the voltage measuring terminal is caused to contact the anode separator 6a or the cathode separator 6b. Thus, the voltage of each cell 10 can be measured. Therefore, the maintenance can be efficiently and surely carried out.

To prevent the heat release (loss) from the PEFC 100 without closing the voltage measuring terminal insertion hole 61 by the stopper member 70, it is preferable that the heat insulating plate 60a be made of such a material that the through hole formed by plunging the voltage measuring terminal into the heat insulating plate 60a closes by pulling out the voltage measuring terminal from the through hole of the heat insulating plate 60a.

Embodiment 15

Figure 18:
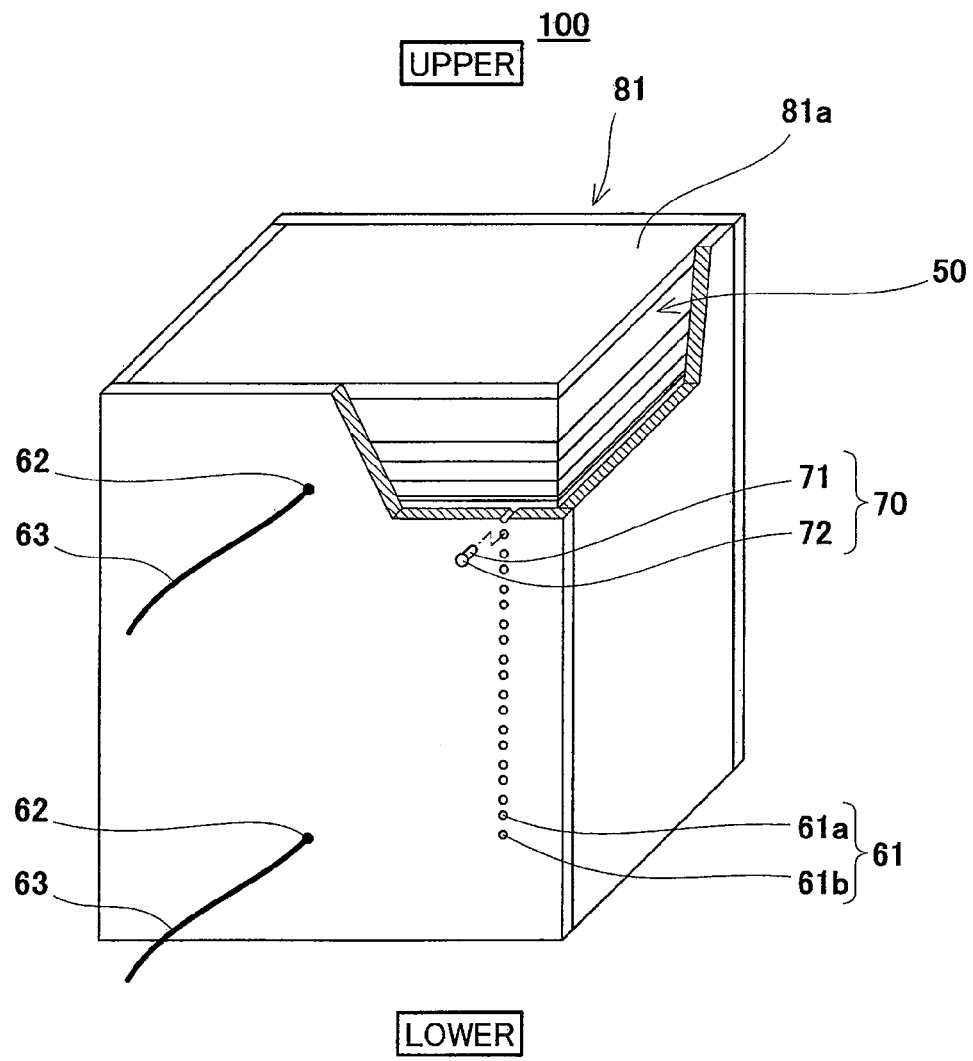
FIG. 18 is a perspective view schematically showing a schematic configuration of the PEFC according to Embodiment 15 of the present invention.

FIG. 18 is a perspective view schematically showing a schematic configuration of the PEFC according to Embodiment 15. In FIG. 18, a part of the PEFC is cut away to show an internal structure thereof, and a vertical direction of the PEFC is shown as a vertical direction of the drawing.

As shown in FIG. 18, the PEFC 100 according to Embodiment 15 is the same in basic configuration as the PEFC 100 according to Embodiment 5 but is different from the PEFC 100 according to Embodiment 5 in that the covering members are constituted by only the storing plates 80a, and the heat insulating casing 60 (the heat insulating plates 60a) is not provided.

The PEFC 100 according to Embodiment 15 configured as above can obtain the same operational advantages as the PEFC 100 according to Embodiment 5.

Embodiment 16

Figure 19:
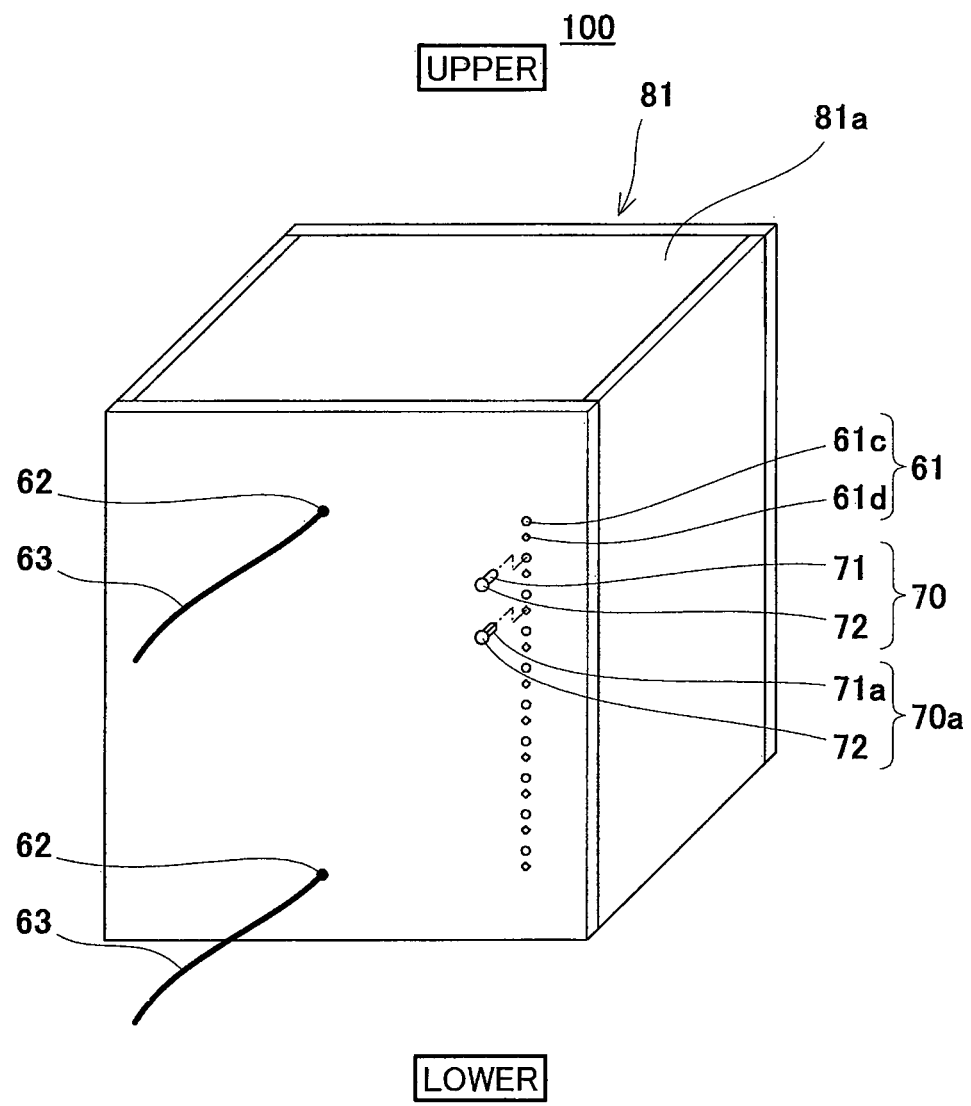
FIG. 19 is a perspective view schematically showing a schematic configuration of the PEFC according to Embodiment 16 of the present invention.

FIG. 19 is a perspective view schematically showing a schematic configuration of the PEFC according to Embodiment 16. In FIG. 19, a part of the PEFC is cut away to show an internal structure thereof, and a vertical direction of the PEFC is shown as a vertical direction of the drawing.

As shown in FIG. 19, the PEFC 100 according to Embodiment 16 is the same in basic configuration as the PEFC 100 according to Embodiment 6 but is different from the PEFC 100 according to Embodiment 6 in that: the covering members are constituted by only the storing plates 80a, and the heat insulating casing 60 (the heat insulating plates 60a) is not provided.

The PEFC 100 according to Embodiment 16 configured as above can obtain the same operational advantages as the PEFC 100 according to Embodiment 6.

Embodiment 17

Figure 20:
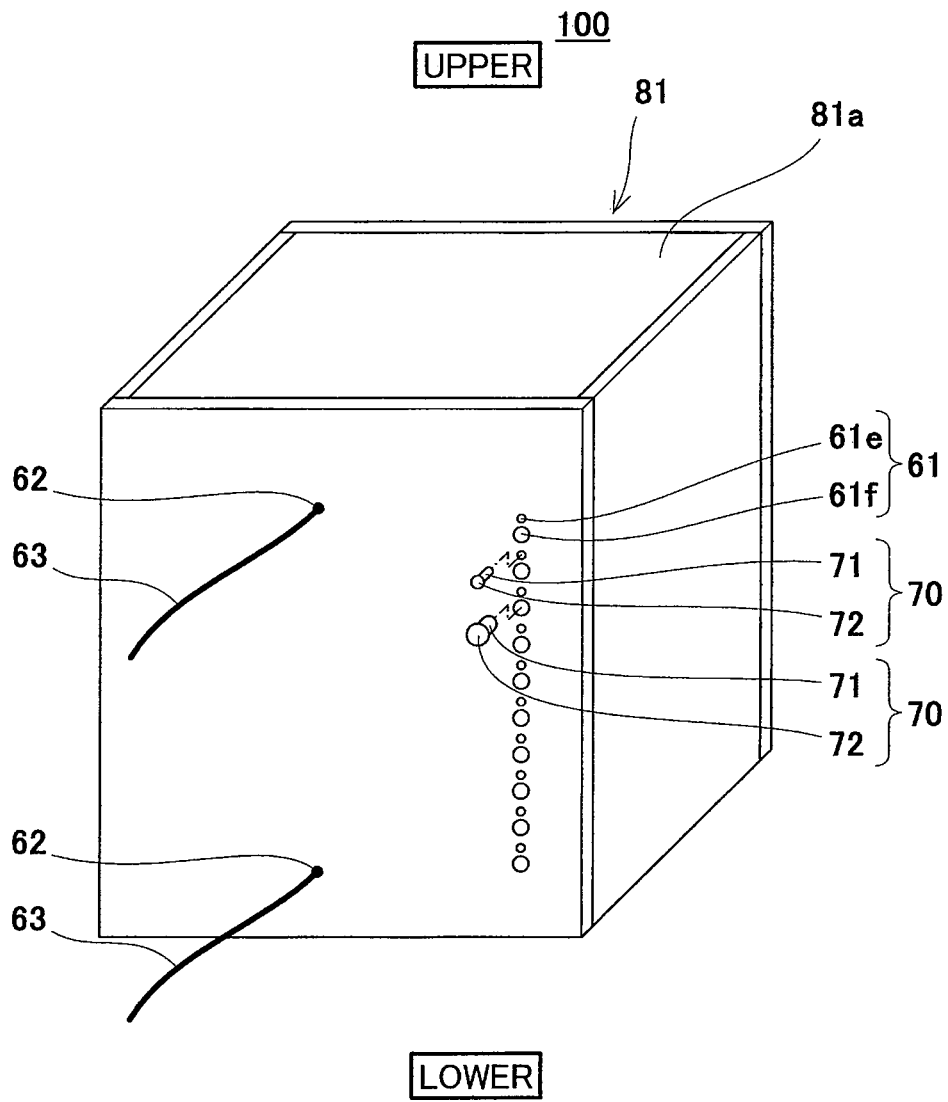
FIG. 20 is a perspective view schematically showing a schematic configuration of the PEFC according to Embodiment 17 of the present invention.

FIG. 20 is a perspective view schematically showing a schematic configuration of the PEFC according to Embodiment 17. In FIG. 20, a vertical direction of the PEFC is shown as a vertical direction of the drawing.

As shown in FIG. 20, the PEFC 100 according to Embodiment 17 is the same in basic configuration as the PEFC 100 according to Embodiment 7 but is different from the PEFC 100 according to Embodiment 7 in that the covering members are constituted by only the storing plates 80a, and the heat insulating casing 60 (the heat insulating plates 60a) is not provided.

The PEFC 100 according to Embodiment 17 configured as above can obtain the same operational advantages as the PEFC 100 according to Embodiment 7.

Embodiment 18

Figure 21:
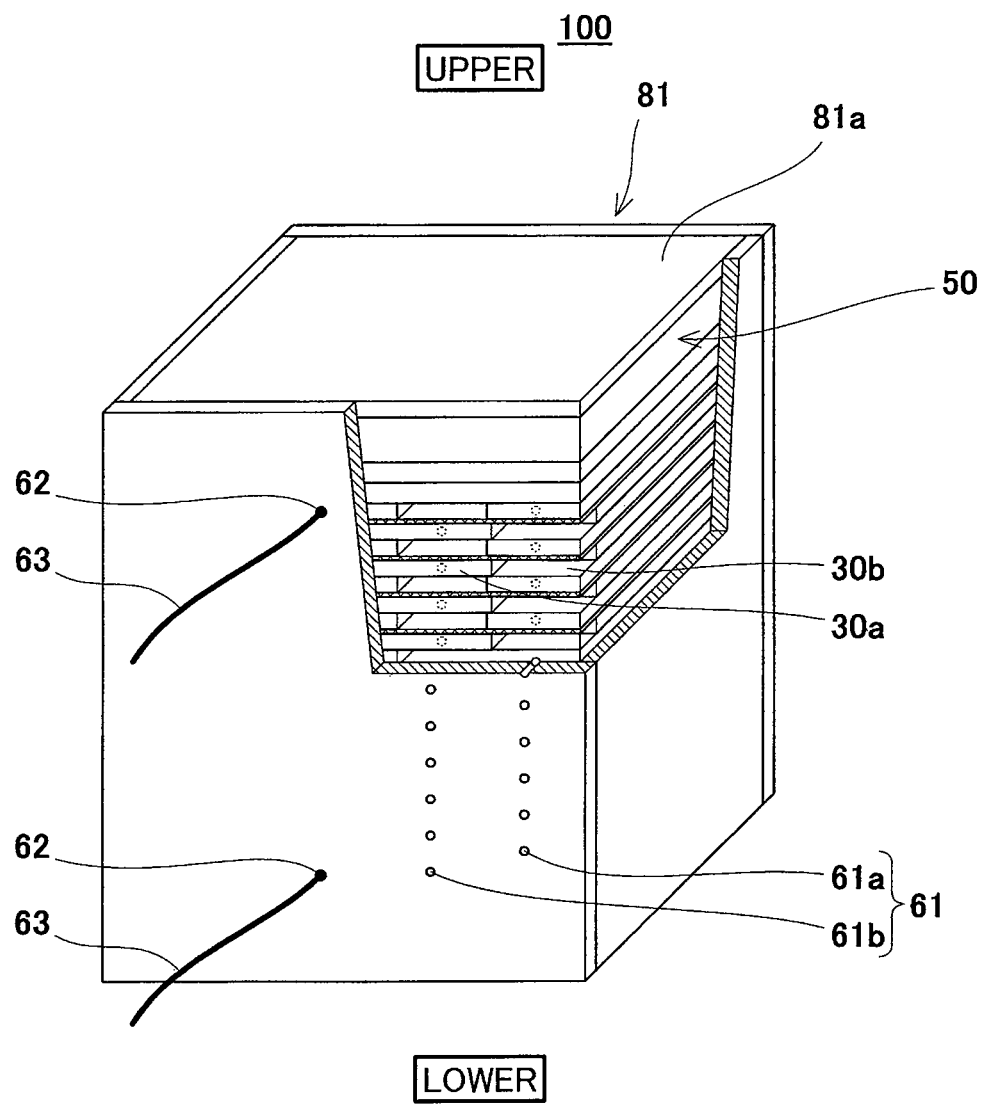
FIG. 21 is a perspective view schematically showing a schematic configuration of the PEFC according to Embodiment 18 of the present invention.

FIG. 21 is a perspective view schematically showing a schematic configuration of the PEFC according to Embodiment 18. In FIG. 21, a part of the PEFC is cut away to show an internal structure thereof, and a vertical direction of the PEFC is shown as a vertical direction of the drawing.

As shown in FIG. 21, the PEFC 100 according to Embodiment 18 is the same in basic configuration as the PEFC 100 according to Embodiment 8 but is different from the PEFC 100 according to Embodiment 8 in that the covering members are constituted by only the storing plates 80a, and the heat insulating casing 60 (the heat insulating plates 60a) is not provided.

The PEFC 100 according to Embodiment 18 configured as above can obtain the same operational advantages as the PEFC 100 according to Embodiment 8.

Embodiment 19

Figure 22:
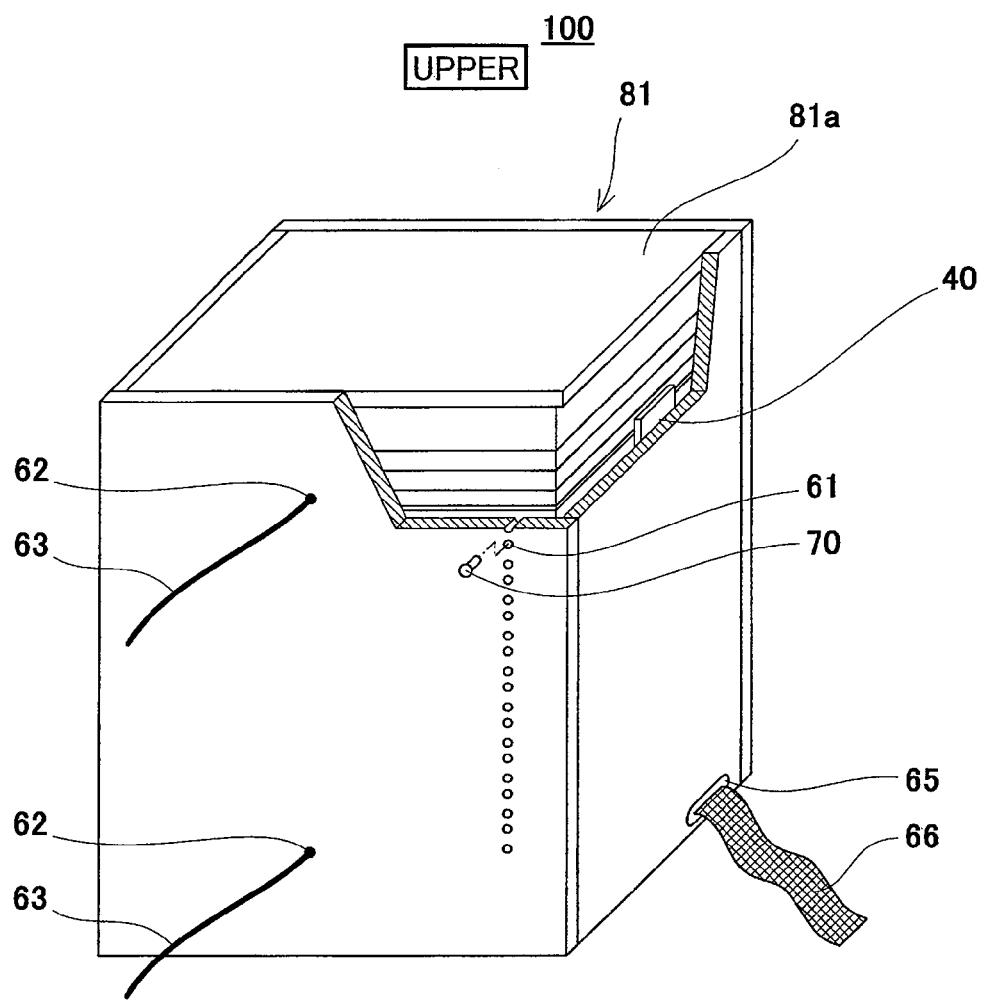
FIG. 22 is a perspective view schematically showing a schematic configuration of the PEFC according to Embodiment 19 of the present invention.

FIG. 22 is a perspective view schematically showing a schematic configuration of the PEFC according to Embodiment 19. In FIG. 22, a part of the PEFC is cut away to show an internal structure thereof, and a vertical direction of the PEFC is shown as a vertical direction of the drawing.

As shown in FIG. 22, the PEFC 100 according to Embodiment 19 is the same in basic configuration as the PEFC 100 according to Embodiment 9 but is different from the PEFC 100 according to Embodiment 9 in that the covering members are constituted by only the storing plates 80a, and the heat insulating casing 60 (the heat insulating plates 60a) is not provided.

The PEFC 100 according to Embodiment 19 configured as above can obtain the same operational advantages as the PEFC 100 according to Embodiment 9.

From the foregoing explanation, many modifications and other embodiments of the present invention are obvious to one skilled in the art. Therefore, the foregoing explanation should be interpreted only as an example, and is provided for the purpose of teaching the best mode for carrying out the present invention to one skilled in the art. The structures and/or functional details may be substantially modified within the spirit of the present invention.

INDUSTRIAL APPLICABILITY

The polymer electrolyte fuel cell and the method for measuring the voltages of the cells in the polymer electrolyte fuel cell according to the present invention are useful as a polymer electrolyte fuel cell and a method for measuring the voltages of cells in a polymer electrolyte fuel cell, each of which can monitor the voltages of the cells without detaching a heat insulating member covering a cell stack and specify a malfunction of a fuel cell system on site for maintenance. Moreover, the polymer electrolyte fuel cell of the present invention is applicable as a component of a stationary fuel cell cogeneration system, and also applicable as, for example, a power source mounted on a moving or transporting machine, such as a car or a motorcycle.

The invention claimed is:

1. A polymer electrolyte fuel cell comprising:
plate-shaped cells each including a pair of plate-shaped electrically-conductive separators on each of which a reactant gas channel is formed, and a membrane-electrode assembly disposed between the pair of separators;
a cell stack configured by stacking and fastening the cells; and
a covering member covering at least a peripheral surface of the cell stack, wherein
voltage measuring terminal insertion holes used to measure voltages of the cells are formed on the covering member so as to be located at positions corresponding to the separators of the cells, said voltage measuring terminal insertion holes extending fully through said covering member so as to expose the separators of the cells, and
a cross sectional diameter of the voltage measuring terminal insertion hole on the separator side is smaller than a thickness of an adjacent separator.

2. The polymer electrolyte fuel cell according to claim 1, wherein the covering member is formed in a casing shape to entirely cover the cell stack.

3. The polymer electrolyte fuel cell according to claim 1, wherein the voltage measuring terminal insertion holes are formed in a zigzag manner.

4. The polymer electrolyte fuel cell according to claim 3, wherein:
a cutout portion is formed at an end portion of one of the separators constituting the cell; and
the cutout portion is formed so as to be located adjacent to a portion of the other one of the separators constituting the cell which portion corresponds to the voltage measuring terminal insertion hole.

5. The polymer electrolyte fuel cell according to claim 1, wherein:
a convex portion is formed at a portion of the covering member which portion is opposed to a peripheral surface of the cell;
a concave portion is formed on a peripheral surface of the separator; and
the convex portion fits in the concave portion by covering the cell stack with the covering member.

6. The polymer electrolyte fuel cell according to claim 1, wherein a cross-sectional shape of the voltage measuring terminal insertion hole corresponding to one of the separators is different from a cross-sectional shape of the voltage measuring terminal insertion hole corresponding to the other one of the separators.

7. The polymer electrolyte fuel cell according to claim 1, wherein a size of a cross-sectional shape of the voltage measuring terminal insertion hole corresponding to one of the separators is different from a size of a cross-sectional shape of the voltage measuring terminal insertion hole corresponding to the other one of the separators.

8. The polymer electrolyte fuel cell according to claim 1, wherein the voltage measuring terminal insertion hole is closed by a stopper member at any time other than a time when the voltage measuring terminal insertion hole is used for voltage measurement.

9. The polymer electrolyte fuel cell according to claim 8, wherein heat conductivity of the stopper member is equal to or lower than heat conductivity of the covering member.

10. The polymer electrolyte fuel cell according to claim 1, wherein a fuel cell monitoring device configured to measure the voltages of the cells is disposed inside the covering member.

11. The polymer electrolyte fuel cell according to claim 1, wherein the covering member is constituted by a heat insulating member.

12. The polymer electrolyte fuel cell according to claim 1, wherein the covering member is constituted by a storing member.

13. The polymer electrolyte fuel cell according to claim 1, wherein the covering member is constituted by a heat insulating member and a storing member.

14. The polymer electrolyte fuel cell according to claim 1, wherein the voltage measuring terminal insertion holes expose a side surface of the separators of the cells.

15. The polymer electrolyte fuel cell according to claim 1, wherein the covering member covers at least two peripheral surfaces of the cell stack.

* * * * *